United States Patent
Rosedale et al.

(10) Patent No.: US 10,086,285 B2
(45) Date of Patent: Oct. 2, 2018

(54) SYSTEMS AND METHODS FOR IMPLEMENTING DISTRIBUTED COMPUTER-GENERATED VIRTUAL ENVIRONMENTS USING USER CONTRIBUTED COMPUTING DEVICES

(71) Applicant: High Fidelity, Inc., San Francisco, CA (US)

(72) Inventors: Philip Rosedale, San Francisco, CA (US); Freddy Heiberger, San Francisco, CA (US); Ryan Karpf, San Francisco, CA (US); Stephen Birarda, San Francisco, CA (US); Brad Hefta-Gaub, Seattle, WA (US); Andrzej Kapolka, San Francisco, CA (US)

(73) Assignee: HIGH FIDELITY, INC., San Francisco, CA (US)

( * ) Notice: Subject to any disclaimer, the term of this patent is extended or adjusted under 35 U.S.C. 154(b) by 479 days.

(21) Appl. No.: 14/273,327

(22) Filed: May 8, 2014

(65) Prior Publication Data

US 2015/0321101 A1    Nov. 12, 2015

(51) Int. Cl.
*A63F 13/54* (2014.01)
*A63F 13/355* (2014.01)
(Continued)

(52) U.S. Cl.
CPC ............ *A63F 13/54* (2014.09); *A63F 13/355* (2014.09); *A63F 13/52* (2014.09); *A63F 13/63* (2014.09);
(Continued)

(58) Field of Classification Search
CPC .................. G06F 9/5072; G06F 9/50
See application file for complete search history.

(56) References Cited

U.S. PATENT DOCUMENTS

| | | | |
|---|---|---|---|
| 6,112,225 A | 8/2000 | Reiner et al. | |
| 6,349,301 B1 * | 2/2002 | Mitchell | A63F 13/12 |

(Continued)

OTHER PUBLICATIONS

Buy Land: FAQ | Second Life [online] [dated Mar. 4, 2013]. [retrieved Jun. 29, 2016]. Retrieved from the Internet: <https://web.archive.org/web/20130304105459/http://secondlife.com/land/faq/?>.*

*Primary Examiner* — Robert T Clarke, Jr.
(74) *Attorney, Agent, or Firm* — Vierra Magen Marcus LLP

(57) ABSTRACT

Described herein are systems and methods for providing a computer-generated virtual environment that is at least partially supported by user contributed computing devices. In an embodiment, an indication is received, from each of a plurality of user contributed computing devices, that the computing device is available to contribute at least a portion of its computational resources to support the virtual environment. At least some of the computing devices, from which the indications are received, are assigned computational tasks that are used to support the virtual environment. Credits are provide to users associated with the computing devices that are assigned and perform the assigned computational tasks. A record of the credits provided to users is maintained. Users that interact with the virtual environment can use their credits to pay for computational tasks performed to support the users' interactions with the virtual environment and/or to pay for virtual goods and/or virtual services.

22 Claims, 8 Drawing Sheets

(51) Int. Cl.
*A63F 13/52* (2014.01)
*A63F 13/63* (2014.01)
*A63F 13/352* (2014.01)
*A63F 13/792* (2014.01)

(52) U.S. Cl.
CPC ........... *A63F 13/352* (2014.09); *A63F 13/792* (2014.09); *A63F 2300/6081* (2013.01)

(56) References Cited

U.S. PATENT DOCUMENTS

| | | | |
|---|---|---|---|
| 6,738,813 B1 * | 5/2004 | Reichman | G06Q 10/06 709/223 |
| 8,073,778 B2 | 12/2011 | Williams et al. | |
| 8,612,196 B2 | 12/2013 | Rosedale et al. | |
| 2001/0037311 A1 | 11/2001 | McCoy et al. | |
| 2002/0178255 A1 | 11/2002 | Hobart | |
| 2002/0198769 A1 | 12/2002 | Ratcliff | |
| 2003/0182001 A1 | 9/2003 | Radenkovic et al. | |
| 2003/0195735 A1 * | 10/2003 | Rosedale | G06F 17/5009 703/13 |
| 2004/0192354 A1 | 9/2004 | Sawano | |
| 2004/0260652 A1 | 12/2004 | Rose | |
| 2007/0060232 A1 * | 3/2007 | Sakaguchi | A63F 13/10 463/8 |
| 2007/0250446 A1 | 10/2007 | Zalewski | |
| 2008/0146342 A1 * | 6/2008 | Harvey | A63F 13/10 463/42 |
| 2009/0066690 A1 | 3/2009 | Harrison | |
| 2010/0169799 A1 | 7/2010 | Hyndman et al. | |
| 2012/0016926 A1 | 1/2012 | Toga et al. | |
| 2013/0036373 A1 * | 2/2013 | Alderfer | G06Q 10/103 715/757 |
| 2014/0004952 A1 * | 1/2014 | Kern | G07F 17/3258 463/42 |
| 2015/0223043 A1 * | 8/2015 | Miluzzo | H04W 4/08 455/406 |

* cited by examiner

SYSTEMS AND METHODS FOR IMPLEMENTING DISTRIBUTED COMPUTER-GENERATED VIRTUAL ENVIRONMENTS USING USER CONTRIBUTED COMPUTING DEVICES

FIELD OF THE INVENTION

Embodiments of the present invention generally relate to virtual reality systems and more particularly to systems and methods that can be used to provide computer generated virtual environments.

BACKGROUND

The term virtual environment refers to a computer-generate environment that generally behaves in ways that follow a user's expectations for a real-world environment. One or more computing devices that are used to produce the virtual environment can be termed a virtual reality system, and the creation of the virtual environment by the virtual reality system can be termed rendering the virtual environment. A virtual environment may include an avatar, which is in this context is an entity belonging to the virtual environment that has a point of perception in the virtual environment. The virtual reality system may render the virtual environment for the avatar as perceived from the avatar's point of perception. A user of a virtual environment system may be associated with a particular avatar in the virtual environment.

In many virtual environments, a user who is associated with an avatar can interact with the virtual environment via the avatar. Depending upon implementation, a user may not only be able perceive the virtual environment from the avatar's point of perception, but may also be able to change the avatar's point of perception in the virtual environment and otherwise change the relationship between the avatar and the virtual environment or change the virtual environment itself.

With the advent of high-performance personal computers and high-speed networking, virtual environments—and in particular multi-avatar interactive virtual environments in which avatars for many users are interacting with the virtual environment at the same time—have moved from engineering laboratories and specialized application areas into widespread use. Examples of such multi-avatar virtual environments include environments with substantial graphical and visual content like those of massively-multiplayer on-line games (MMOGs), such as World of Warcraft™, and user-defined virtual environment environments, such as Second Life™. In such systems, each user of the virtual environment is represented by an avatar of the virtual environment, and each avatar has a point of perception in the virtual environment based on the avatar's virtual location and other aspects in the virtual environment. Users of the virtual environment control their avatars and interact within the virtual environment via client computers such as PC or workstation computers. The virtual environment is further implemented using server computers. Renderings for a user's avatar are produced on a user's client computer according to data sent from the server computers. Data is transmitted between the client computers and server computers of the virtual reality system over the network in data packets.

If the virtual environment is interactive, the appearance and actions of the avatar for a user are what other avatars in the virtual environment perceive (e.g., see and/or hear, etc.) as representing the user's appearance and action. There is no requirement for the avatar to appear or be perceived as resembling any particular entity, and an avatar for a user may intentionally appear quite different from the user's actual appearance, which is one of the appealing aspects to many users of interaction in a virtual environment in comparison to interactions in the "real world".

Capabilities of existing virtual environments are often limited by processing resources, also referred to herein as computational resources. In other words, due to the extensive computational resources required to implement virtual environments, there is typically a limit to the scope of virtual environments. Additionally, latency associated with existing virtual environments typically provides for visual an audio experiences that are less realistic than desired.

SUMMARY

Specific embodiments of the present invention relate to systems and methods for providing a computer-generated virtual environment that is at least partially supported by a plurality of user contributed computing devices. In certain such embodiments, an indication is received, from each of a plurality of user contributed computing devices, that the computing device is available to contribute at least a portion of its computational resources to support the virtual environment. Depending upon implementation, such indications can be received by a domain server (e.g., that implements an assignment server function) or a global assignment server. At least some of the computing devices, from which the indications are received, are assigned computational tasks that are used to support the virtual environment. Such tasks can include, but are not limited to, a voxel-server related task, an avatar-mixer related task and an audio-mixer related task.

Credits are provide to users associated with the computing devices that are assigned and perform computational tasks used to support the virtual environment. In accordance with an embodiment, how many credits are provided to a user is based on a length of time that the computing device, associated with the user, performs one or more computational tasks used to support the virtual environment. Alternatively, or additionally, how many of credits are provided to a user can be based on how many computational tasks the computing device, associated with the user, performs to support the virtual environment. How many credits are provide to a user can alternatively, or additionally, be dependent on the quality and/or reliability of the computational tasks the computing device, associated with the user, performs to support the virtual environment. There can also be a record that is maintained of the credits provided to users associated with the computing devices that are assigned and perform computational tasks used to support the virtual environment. Users that interact with the virtual environment can use their credits to pay for computational tasks performed to support the users' interactions with the virtual environment. Such tasks can include, but are not limited to, a voxel-server related task, an avatar-mixer related task and an audio-mixer related task. Additionally, or alternatively, a user can use their credits to pay for virtual goods and/or virtual services. In certain embodiments, a first user, which is interacting with a domain that is owned by a second user, can use their credits to pay the second user for interacting with the domain that is owned by the second user. In certain embodiments, the aforementioned credits can be units of a virtual currency. Alternatively, the aforementioned credits can be exchanged for virtual currency. Either way, the earned credits have a value that can be used to enable a user to participate in a virtual environment and/or enhance their participation in the virtual environment.

Specific embodiments of the present invention relate to systems and method for providing an immersive audio experience in a computer-generated virtual environment. Such methods can be used, e.g., with a virtual environment that includes one or more domains, wherein each of the domains includes at least two audio source nodes and at least two audio listener nodes. At least one of the audio source nodes and at least one of the audio listener nodes can correspond to a same node (e.g., a same avatar) in the virtual environment, in which case that node can also be referred to as an audio source/listener node.

In accordance with an embodiment, an audio-mixer is placed at a location in a domain of the virtual environment, such that the audio-mixer is treated as having a location within a domain of a virtual world. Various different techniques for determining the location at which to place an audio-mixer are described herein, including, but not limited to, placing the audio-mixer at the center of the audio source nodes that are directly connected to the audio-mixer.

The audio-mixer receives a separate audio feed from each of the audio source nodes directly connected to the audio-mixer, wherein each of the received audio feeds includes corresponding location information, corresponding position information and corresponding intrinsic loudness information. The audio-mixer mixes the audio feeds received by the audio-mixer, in dependence on the corresponding location, position and intrinsic loudness information, to thereby generate a separate spatialized mixed audio feed for each of the audio listener nodes directly connected to the audio-mixer. Preferably, the audio-mixer also mixes the audio feeds received by the audio-mixer in dependence on the locations and positions of the audio listener nodes directly connected to the audio-mixer. The audio-mixer sends, to each of the audio listener nodes directly connected to the audio-mixer, the separate spatialized mixed audio feed generated for the audio listener.

In accordance with an embodiment, the mixed audio feeds, generated for the audio listener nodes, include left channel audio data and right channel audio data having a phase delay therebetween that is used to simulate sound having to travel different distances to reach the audio listener node's left and right monitor channels, accounting for the time difference introduced by the distance off-axis sound needs to reach a listener's left and right ears in the real world.

An audio-mixer can also receive mixed audio feeds from other audio-mixers, and send mixed audio feeds to other audio-mixers, wherein the mixed audio feeds sent between audio-mixers are non-spatialized mixed audio feeds. In such cases the non-spatialized mixed audio feed(s), received from the other audio mixer(s), can also be mixed with the audio feeds received from the audio source nodes directly connected to the audio-mixer, when generating the separate spatialized mixed audio feed for each of the audio listener nodes directly connected to the audio-mixer. An audio-mixer can also send non-spatialized mixed audio feeds to other audio-mixers. In order to do so, the audio-mixer first mixes the audio feeds received by the audio-mixer, independent of the location, position and intrinsic loudness information corresponding to the received audio feeds, to generate the non-spatialized mixed audio feed. The audio-mixer can then sending the non-spatialized mixed audio feed to at least one other audio-mixer. Such a non-spatialized mixed audio feed, can, however, include location information indicative of the location of the audio-mixer sending the non-spatialized mixed audio feed. Additionally, the non-spatialized mixed audio feed can include intrinsic loudness information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

The following description is of various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

Figure 1:
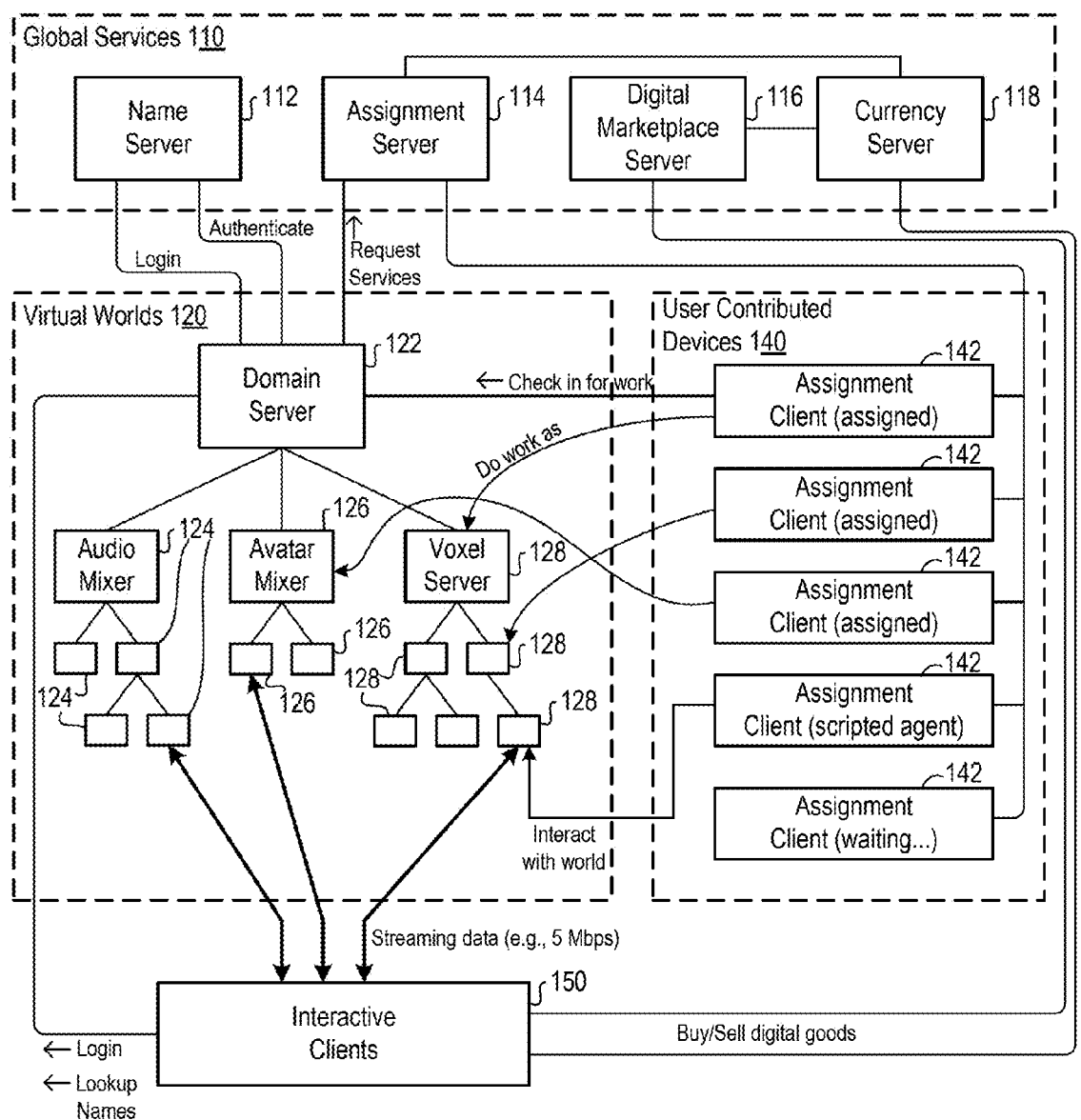
FIG. 1 is a high level block diagram of various components of a system according to an embodiment of the present invention.

FIG. 1 is a high level block diagram of various components of a system 100 according to an embodiment of the present invention. The various components shown in FIG. 1 can communicate with other components shown in FIG. 1 using one or more networks, including, but not limited to, the Internet, a local area network (LAN), a wide area network (WAN), a virtual private network (VPN), or any other network or combinations of networks. Such networks, or portions thereof, can be wired, wireless, optical, etc. Embodiments of the present invention are not tied to any particular type of network. Rather, what is important is that the various components, or at least a subset of the various components, can communicate as described herein.

Referring to FIG. 1, the system 100 is shown as being made up of various subsystems, including a global services subsystem 110, a virtual worlds subsystem 120, a user contributed devices subsystem 140, and an interactive clients subsystem 150, each of which may be referred to with or without including the "subsystem" modifier.

The global services subsystem 110 is shown as including a name server 112, an assignment server 114, a digital marketplace server 116 and a currency server 118, each of which are discussed below.

The virtual worlds subsystem 120, which supports at least one virtual world, and preferably support a plurality of internetworked virtual worlds, is shown as including a domain server 122, audio-mixers 124, avatar mixers 126 and voxel servers 128. Each audio-mixer 124 can also be referred to as an audio-mixer server 124, or an audio server 124. Similarly, each avatar mixer 126 can also be referred to as an avatar mixer server 126, or an avatar server 126. Where there are multiple virtual worlds that are being supported, all of the virtual worlds can be collectively referred to as the metaverse. Voxel servers are one type of display-related server that performs visual related tasks. Other types of display-related servers, such as, but not limited to, animated particle servers, self-describing voxel (a.k.a. "metavoxel") servers, servers for scripting agents, and mesh model servers, can also be used for other visual related tasks.

The user contributed devices 140 are computing devices 142 whose owners or users have agreed to contribute at least some of the computing devices' processing resources in exchange for virtual currency. Computing devices can be configured to operate as user contributed devices by downloading an application that enables such operation. Depending on implementation, the same application, or a separate application, can enable computing devices to also operate as interactive clients 150. More generally, the same computing device that functions as an interactive client 150, during some periods of time, can function as a user contributed device 140 at during other periods of time.

The interactive clients 150, which can also be referred to as interactive agents, are computing devices functioning as web application 'clients' that let users access one or more of the virtual worlds 120. As mentioned above, the same computing device may at one point in time act as an interactive client 150, and at another point in time (e.g., while the user of the computing device is sleeping or otherwise not using their computing device) act as an assignment client 142. More generally, computing devices may operate as an interactive client 150 or a contributed device 140, which once assigned a task, operates as an assignment client 142. Examples of computing devices, which can operate as interactive agents or user contributed devices/assignment clients, include personal computers (PCs), mobile phones, and tablet computers, but are not limited thereto.

Additional details of the various subsystem servers of the global services 110 are provided below. However, it is first useful to note that the term server, as the term is used herein, refers to a combination of computing device hardware and software that responds to requests across a computer network to provide, or help to provide, a network service. Servers can be run on a dedicated computing device or a plurality of computing devices, some, all or none of which are dedicated to operating as a server. It is also possible that a single computing device can provide several services, or portions thereof, and thus can have several servers running or run portions of several servers. In certain embodiments described herein, user contributed devices 140 can function as servers, if such devices 140 are tasked by the assignment server 114 or domain server 122 to provide a network service, such as, but not limited to, an audio-mixer, avatar-mixer or voxel-server type of service.

The name server 112 is a global service that allows a user to easily identify themselves to other users. In accordance with an embodiment, the name server 112 will also connect with other identify services (e.g., Facebook™, Twitter™, LinkedIn™) to add value to the name service, for example, by allowing an avatar to clearly identify themselves to someone else as a real life co-worker. In accordance with an embodiment, the name server 112 is a root server that determines which server is responsible for a specific part of a virtual world 120. When an interactive client 150 connects to a virtual world 120, the interactive client 150 starts by sending a packet to the name server 112 with a location in virtual space (identified by name and/or coordinates), and the name server 112 answers the interactive client with the hostname or IP address of the server that the interactive client should communicate with next. In an embodiment, the function of the name server 112 may be handled by a regular Domain Name System (DNS), by extending the DNS protocol to include metadata for spatial information.

The assignment server 114 is a global service (and thus, can also be referred to as the global assignment server 114) that provides work task fulfillment to nodes operating in at least one of the virtual worlds 120. More specifically, the assignment server 114 provides work assignments to user contributed devices 140 that have requested work via a domain server 122. As mentioned above, one a user contributed device 140 has been provide with an assignment, the user contributed device 140 can be referred to as an assignment client 142. User contributed devices 140 register their availability to complete work tasks with a domain server 122, which is discussed in additional detail below. Work tasks can include, e.g., providing an audio-mixer related task, an avatar-mixer related task, or a voxel-server related task or some other visual related task, such as, but not limited to, an animated particle related task, a self-describing voxel (a.k.a. "metavoxel") related task, a scripting agent related task, or a mesh model related task. More generally, the assignment-server 114 manages a partnering between domains needing workers and user contributed devices 140 willing and able to do work.

The digital marketplace server 116 enables users of interactive clients 150 to exchange digital assets (e.g., virtual currency, virtual clothing, jewelry, furniture, gadgets, toys, etc.) with each other, preferably in a fast, easy and compelling way. In accordance with an embodiment, a company that supports/provides the global services 110 charges a commission for these transactions in exchange for supporting the digital marketplace server 116 and/or other global services. The commission can be a percentage of a transaction, or a flat fee, or a combination thereof, but is not limited thereto.

The currency server 118, in accordance with an embodiment, maintains a record (e.g., chart or table, but not limited thereto) of accounts with credit balances. This record of accounts is debited and credited by a computation marketplace when devices are used, sold, bought, or otherwise consumed or transferred in one or more virtual world. The aforementioned computation marketplace is represented by the various lines and arrows that flow between the user contributed devices 140, the assignment server 114, the currency server 118, and the domain server 122. In an embodiment, an application program interface (API) allows account owners to transfer credits between accounts.

Virtual currency can be used in one or more virtual worlds 120 to buy a virtual object, pay for a virtual service, and/or pay a virtual rent or mortgage, but is not limited thereto. Where there is a metaverse that includes multiple virtual worlds, a common virtual currency can be used throughout the metaverse, or each virtual world of the metaverse can includes its own virtual currency. Where different virtual worlds include their own virtual currency, a virtual currency exchange may allow different types of virtual currencies to be exchanged, potentially for a fee that is paid in a virtual currency or real world currency. In certain embodiments, virtual currency can be converted to real world currency, and vice versa. In other embodiments, real world currency can be converted to virtual currency, but virtual currency cannot be converted to real world currency. In other words, a user may purchase virtual currency using real world currency. Additionally, a user may be able to earn virtual currency, e.g., by selling virtual items or providing virtual services. In specific embodiments, described in additional detail below, a user can earn virtual currency in exchange for allowing a user's computing device to perform a work task that is assigned to it. In other words, a user may earn virtual currency in exchange for allowing their computing device to act as an assignment client 142. For the purpose of this description, the term "user contributed device" refers to a computing device whose owner or user agreed to contribute at least some of the computing devices' processing resources in exchange for virtual currency, and the term "assignment client" refers to user contributed device that has been provided with an assignment.

A benefit of using assignment clients 142 as servers that support virtual worlds is that it reduces (and preferably eliminates) the limitations on content or audience size imposed by a static server network. In an embodiment, the virtual worlds 120 use self-assembling hierarchical networks of IP-connected peer computing devices, in which devices needed to simulate, store, or distribute data within the virtual worlds 120 are dynamically drawn from a pool of available computing devices contributed by users. Because there is a large and growing number of Internet connected devices worldwide with excess computation resources or bandwidth, the virtual worlds 120 can scale larger than a server-based approach. Furthermore, the rapid reductions in latency seen in emerging standards, such as Long Term Evolution (LTE), enable small wireless computing devices (e.g., mobile phones and tablet computers) to do the work traditionally allocated to dedicated servers.

In accordance with an embodiment, the virtual worlds 120 have an economy that is based on credits, wherein the credits can be earned based on computations contributed to the overall network. Such an approach allows for a very large and dynamic network of devices to contribute computing resources in an efficient real-time manner, making it possible to have both very large audiences and very high complexity content without the overhead of a fixed network of servers. The creation of this economy is based on the understanding that there is a large and increasing pool of idle computation capacity on internet-connected devices.

In accordance with an embodiment, users wanting to contribute their computing device(s) to the overall system 100 register with the global assignment server 114 or a domain server 122. In one embodiment, users communicate, via their computing device, with the assignment server 114 or a domain server 122 to inform that assignment server 114 or the domain server 122 that their computing device is available for contributing computing resources. In another embodiment, after a computing device has been idle for a predetermined length of time, that computing device is assumed to be available for contributing computing resources. In still another embodiment, during certain periods of each day (e.g., during hours that it is presumed that a computing device's user is asleep), a computing device can be assumed to be available for contributing computing resources, so long as the device is idle. Combinations of the above embodiments are also possible, as are further embodiments for determining when a computing device is available for contributing computing resources.

The assignment server 114 or a domain server 122 allocates computation assignments (also referred to as tasks) to user contributed devices 140, for which the users owning or otherwise associated with the devices 140 will receive credits. These assignments can be created in response to other users needing computation resources, e.g., to simulate the physics in the part of the virtual world that a user owns. In accordance with an embodiment, a user can specify the price they are willing to pay for assignments done for them by computing devices owned by other users. In accordance with an alternative embodiment, prices (that a user pays for assignments done for them by computing devices owned by other users) are predetermined fixed prices. In still another embodiments, prices can be dependent on supply and demand, and/or other dynamic variables. In an embodiment, the assignment server 114 or a domain server 122 creates a queue of available assignments, and gives assignments out to a user contributed device 140 in the manner which attempts to maximize the credits that user associated with the user contributed device 140 receives.

The domain server 122 is the hostname associated (e.g., by the name server 112) with a given domain, wherein a domain corresponds to a named volume in a virtual world. In accordance with an embodiment, the domain server 122 is the first server that an interactive client 150 contacts when the interactive client 150 wants to see, hear and/or interact with contents of a domain. The domain server 122 can provide an interactive client 150 with the addresses of other servers that the interactive client 150 will communicate with to send and receive data in the domain. The domain server 122 can also give an interactive client 150 information about other interactive clients 150 that are in the same area of a virtual world.

The domain server 122 can also request devices from the computation marketplace. In other words, when the domain server 122 needs computing resources from user contributed devices 140, the domain server can advertise its needs and the assignment server 114 assigns available user computing devices 140, and transfers credits appropriately to contributors. In an embodiment, each domain has its own domain server 122. Nevertheless, a same computing device can provide the domain servers 122 for multiple domains.

In accordance with an embodiment, when an interactive client 150 wants to access a virtual world 120, the interactive client 150 initially connects to the name server 112 to find which domain server 122 to which to connect. The interactive client 150 then connects to the domain server 122 identified by the name server 112 to get the addresses of the audio-mixer 124, avatar mixer 126 and voxel server 128, that the interactive client 150 should use. The interactive client 150 then connects to those servers, updating their location and orientation, and these servers send them a stream of audio data, avatar data and voxel data, as appropriate. If the interactive client 150 wants to modify things in the virtual world, the interactive client 150 either makes changes to the corresponding voxels themselves, or alternatively communicates with a scripting agent to directly edit the objects in the world, wherein one of the user contributed devices 140 can be assigned a scripting agent task.

The audio-mixers 124, avatar-mixers 126 and voxel-servers 128 can be implemented using dedicated servers, but preferably are implemented by user contributed devices 140 that have been assigned audio-mixer, avatar-mixer and voxel-server related tasks. Indeed, when a user contributed device 140 has been assigned and is performing an audio-mixer task, that user contributed device 140 can be referred to as an audio-mixer 124. Similarly, avatar-mixers and voxel-servers can be implemented by user contributed devices 140, in which case the user contributed devices can be referred to as an avatar-mixer or a voxel-server. Accordingly, while in FIG. 1 the audio-mixers 124, avatar-mixers 126 and voxel-servers 128 are shown as being separate blocks from the user contributed devices 140, the user contributed devices 140 can function as the audio-mixers 124, avatar-mixers 126 and voxel-servers 128.

The voxel server 128 is where the 'photons' of the virtual world are stored, and more generally, are used to render what users 'see' when they navigate through and look around a virtual world 120. Voxel servers 128 are assigned by the domain server 122 to store and transmit voxels to requesting interactive clients 150. Such voxels are an array of discrete elements into which a representation of a three-dimensional object is divided. A voxel server 128 can read from and write to a persistent store (e.g., file) and send content from that persistent store to interactive clients 150 that connect and query the voxel server 128. A voxel server 128 may store the persistent content on a network location so that a second instance of the voxel server 128 can load that content from the same location if the assignment has been handed over to a different instance. A voxel server 128 is just one type of display-related server that performs visual related tasks. Other similar server implementations can be used to address other visual elements, such as animated particles, self-describing voxels (a.k.a. "metavoxels"), scripting agents, and mesh models. In other words, there can also be animated particle servers, self-describing voxel (a.k.a. "metavoxel") servers, servers for scripting agents and/or mesh model servers, used for other visual related tasks.

The avatar mixer 126 receives streams of information from nearby interactive clients 150 and combines them into single packets which are transmitted back to each interactive client 150. In this manner, users can receive information about the other avatars around them, sent in a single hop from them to the mixer and back to the user. Mixers can forward data to other mixers or repeaters to reach farther distances.

The audio-mixer 124 is responsible for receiving, mixing, and outputting audio feeds so that audio experiences for users of interactive clients 150 controlling avatars within a virtual world are similar to the audio experiences of people within the real world. This can include, for example, appropriately controlling the loudness and directionality of audio, and potentially also controlling the frequency response of audio. For example, when a user of an interactive client 150 is represented by an avatar in a virtual world, the loudness of sounds heard by the user of the interactive client 150 (that is controlling the avatar) can depend on the volume of the sounds emitted by other audio sources, which can be referred to as intrinsic loudness, and the distance between the avatar and the audio source(s) in the virtual world. For example, assuming two sounds generated by two different audio sources have the same intrinsic loudness, the sound originating from the audio source that is farther away from a user's avatar should be heard or perceived as softer than sounds originating from the audio source that is closer to the user's avatar. The degree to which sounds are heard as softer with distance can be controlled using a distance-weight factor, e.g., to simulate sound in the real world being generally attenuated by the square of the distance between the source of the sound and the listener. As mentioned above, the intensity of a sound at the audio source can be referred to as the intrinsic loudness of the sound. By contrast, the intensity of a sound at the point of perception, e.g., the location of an avatar, can be referred to as the apparent loudness.

An audio-mixer 124 also controls the directionality of audio. For example, when a user of an interactive client 150 controls an avatar in a virtual world, an audio-mixer 124 can mix and output audio feeds such that sounds originating from audio sources located to the left of the avatar within the virtual world are louder in the user's left ear than the user's right ear. To do this, audio feeds output by the audio-mixer 124 can have left and right channel audio data, wherein the left channel audio data is used to produce audio that is output by a left earphone, headphone or speaker, and the right channel audio data is used to produce audio that is output by a right earphone, headphone or speaker. Additionally, there can be a slight phase delay (e.g., ~1 ms) between the left and right channel audio data to simulate the sound having to travel farther before it reaches the user's right ear, compared to when the sound reaches the user's left ear. In other words, left channel data and right channel data can have a phase delay therebetween that is used to simulate off-axis sound traveling different distances to reach left and right monitor channels that correspond to left and right ears associated with the one of the audio listener nodes. Adjustments in phase delay can be achieved by delaying audio data samples in the right channel audio data relative to the audio data samples in the left channel audio data. Adjustments in volume or loudness can be achieved by adjusting the magnitude of data samples and/or adjusting audio metadata that controls loudness. Such audio metadata can be included, e.g., in the header of audio data packets, but is not limited thereto. When an audio feed is provided by an audio source to the audio-mixer 124, the audio feed can include location and position data that specifies the location and position (e.g., orientation) of the audio source. Position data can, e.g., specify a direction that the audio source is facing (e.g., if the audio source is an avatar). Such positional data can be referred to as positional metadata, and can be included, e.g., in the header of audio data packets, but is not limited thereto.

The audio-mixer 124 captures, mixes, and retransmits audio to nearby interactive clients 150 and other audio-mixers, in a manner somewhat analogous to how real world cell towers connect to nearby cell phones. Audio-mixers 124 are requested from the computation marketplace by the domain server 122, or may have static assignments. The audio-mixer 124 can forward one or more mixed audio feeds that it generates to other audio-mixers 124, to allow sounds to pass through a virtual world over large distances. The audio-mixer 124 can send and receive audio feeds to/from other audio-mixers within the same domain, as well as send and receive audio feeds to/from other audio-mixers in other (e.g., neighboring) domains.

Each avatar controlled by an interactive client 124 can be both an audio source node and audio listener node, and thus, can also be referred to as an audio source/listener node, or simply an audio source/listener. Each audio source/listener node outputs an audio feed and receives a custom mixed audio feed specific to the location and position of the audio source/listener node. This custom mixed audio feed is created by the audio-mixer 124 to which the audio source/listener node is directly connected.

Where an audio source node (also referred to herein simply as an audio source) is not also audio listener node, the audio source node can be referred to as an audio-injector node, or simply an audio-injector. In other words, an audio-injector is an audio source only node. Audio-injectors can be, e.g., virtual inanimate objects that that do not have the ability to listen but have the ability to generate noise or other types of audio. Examples of such audio-injectors include a virtual ocean, virtual thunder and virtual rain. It is also possible that audio-injectors can be animate objects that make noise, but for the purposes of a virtual world, are not treated as listeners. For examples, virtual animals in a virtual zoo may be treated as audio-injectors that make noises that can be mixed by an audio-mixer. However, in many instances, there may be no need to generate audio-feeds to transmit to the virtual animals in the virtual zoo (unless a user's avatar is an animal in the virtual zoo, or unless a virtual animal in the virtual zoo is simulated such that it is responsive to verbal commands or other noises). For another example, virtual birds perched in a virtual tree may be treated as audio-injectors.

When a new audio source/listener (e.g., represented by an avatar) arrives in a domain, the domain server 122 for that domain tells the interactive client 150 corresponding to the new audio source/listener the address of one of the audio-mixers 124 servicing that domain. New audio source/listener nodes can be assigned to an audio-mixer based on the source/listener nodes proximity to the source location of the audio-mixer. More specifically, in order to reduce and preferably minimize latency associated with audio feeds received by and output by audio-mixers 124, the domain server 122 will preferably match an interactive client 150 with an audio-mixer 124 that is relatively close to the interactive client 150 in the real world. Additionally, or alternatively, the domain server 122 (or another service with which the domain server 122 communicates) can monitor and/or estimate latency between various nodes, and match an interactive client 150 with an audio-mixer 124 to minimize latency, or at least keep latency below an acceptable threshold. Additionally, the domain server 122 preferably matches audio-mixers 124 with interactive clients 150 in a manner that achieves load balancing.

In accordance with an embodiment, an audio-mixer 124 receives multiple (N) audio data feeds for audio source nodes connected to the audio-mixer and outputs multiple (M) feeds of custom mixed audio specific to each listener node being handled by the audio-mixer 124 (where N and M are likely different values, but can alternatively be the same). In an embodiment, audio feeds from other audio-mixers are made available as a mixed positional audio feed to the audio listeners directly connected to an audio-mixer. This can be accomplished by using a cascading tree of audio-mixer to audio-mixer transmission.

Individual source/listener nodes send their audio feeds to an audio-mixer 124 servicing the source/listener nodes, along with location and position details for the source. An audio-mixer 124 can also receive audio feeds and location and position details from audio-injectors that are not listeners. Each audio-mixer 124 can use the location and position details, corresponding to incoming audio fees, to mix the incoming audio feeds for each individual listener node that the audio-mixer 124 is servicing. Location details can, e.g., be expressed in x, y and z coordinates, but are not limited thereto. Position details, which may indicate a direction that an audio source (e.g., an avatar) is facing, can be expressed as a vectors, but are not limited thereto. For certain types of audio sources, it may not be relevant to provide position details, e.g., in the case of a virtual water fountain that that shoots water equally over 360 degrees. In such instances position details may not be provided, or the position details may indicate that the audio is uniform over 360 degrees.

Each audio-mixer 124 can also send mixed audio feeds, produced by that audio-mixer 124, to other audio-mixers 124. Similarly, each audio-mixer 124 can receive mixed audio feeds from other audio-mixers 124. In an embodiment, when an audio-mixer sends a mixed audio feed to another audio-mixer, location information is provided, but position information is not provided. Additionally, the audio-mixer 124 sending the mixed audio feed can include intrinsic loudness information, which can be a loudness byte in the header of such audio data packets, but is not limited thereto. Since each audio-mixer knows its own location, an audio-mixer can determine the distance between itself and another audio-mixer from which it receives a mixed audio-feed. The audio-mixer receiving a mixed audio feed from another audio-mixer can thereby use the loudness information and location information to determine how much to attenuate the loudness of the received mixed data feed before or when mixing the mixed audio feed with other audio feeds, wherein the other audio feeds can be received from directly connected audio sources and/or from other audio-mixers. In an embodiment, when an audio-mixer determines that the distance between itself and another audio-mixer (from which a mixed audio feed is received) is greater than a maximum threshold distance, then the mixed audio feed can be discarded or mixed in at a zero loudness.

When an audio-mixer 124 receives one or more mixed audio feeds from one or more other audio-mixer(s), the audio-mixer 124 that received the mixed audio-feed(s) will mix the received mixed audio feed(s) with audio feeds received directly from audio source/listeners and potentially audio feeds received directly from audio-injectors. In accordance with an embodiment, a mixed audio feed, received by one audio-mixer from another audio-mixer, will have the same ingress demand on the receiving audio-mixer as any single audio source would have. In other words, if an audio-mixer 124 is capable of receiving and mixing at total of N audio feeds, then a mixed audio feed, received by the audio-mixer 124 from another audio-mixer, will only account for one of the N audio feeds that the receiving audio-mixer can receive and mix.

In accordance with an embodiment, when an audio-mixer 124 receives a mixed audio feed from another audio-mixer, the location data included with the incoming audio feed will be the location of the audio-mixer 124 from which the mixed audio feed is received. In other words, an apparent location from which a mixed audio feed originates is the location of the audio-mixer sending the mixed audio feed. This enables an audio-mixer that receives the incoming mixed audio feed to utilize the corresponding location data (of the sending audio-mixer) when mixing the mixed audio feed with audio feeds received from source/listener nodes and audio-injector nodes directly connected to the audio-mixer. For example, an audio-mixer that receives a mixed audio feed (from another audio-mixer having a position relatively far from the position of receiving audio-mixer) may be mixed "softer" (i.e., at a lower volume) than audio feeds from source/listener nodes and audio-injector nodes directly connected to the audio-mixer and having positions relatively closed to the audio-mixer.

Additional details of how audio-mixers 124 can mix multiple audio feeds (which can also be referred to as audio streams), and how audio-mixers 124 can be placed at locations within domains of a virtual environment, are described below with reference to FIGS. 5-7.

It is also possible that there are additional components that perform functions similar to those performed by the audio-mixers 124, avatar mixers 126 and voxel servers 128. For example, particle servers (not shown) can handle particle data, where particles are moving objects with locations and velocities and potentially other metadata. Particles can be stored in a sparse octree, where each leaf contains one or more particles, in a balanced fashion. Such particle data can be sent to a requesting interactive client 150 in a manner similar to the voxel server. Particles at a distance can be coalesced through the octree in the same way as voxels.

In accordance with an embodiment, data packets transferred between the various components of the system shown in FIG. 1 are user datagram protocol (UDP) packets, which are also referred to as datagrams. These data packets can be sent between different components, for example an interactive client 150 can send a data packet to a domain server 122, and receive data packets from an audio-mixer 126, etc. Interactive clients 150 and servers may processes in the range of hundreds to thousands of data packets per seconds, but can alternatively process less or more packets.

Figure 2:
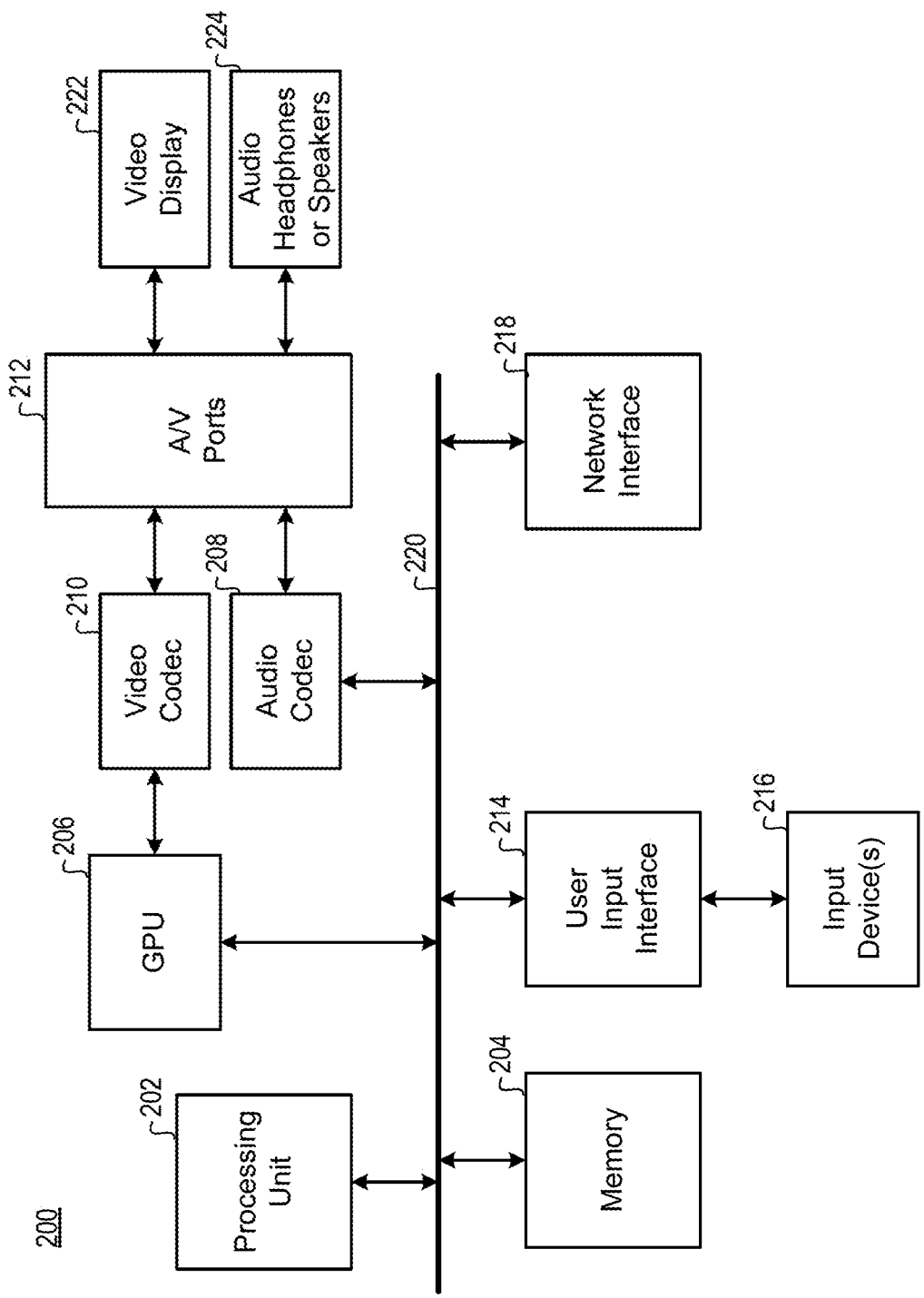
FIG. 2 schematically illustrates exemplary details of a computing device that can operate as an interactive client and/or a user contributed device/assignment client in the system of FIG. 1.

FIG. 2 schematically illustrates exemplary details of a computing device 200 that can operate as an interactive client 150 or user contributed devices/assignment clients 140/142. As mentioned above, such a computing device 200 can be a personal computer (PC), a mobile phone, or a tablet computer, but is not limited thereto.

Referring to FIG. 2, the computing device 200 is shown as including one or more processing units 202 (which can also be referred to a processors), memory 204, a graphical processing unit (GPU) 206, an audio codec 208, a video codec 210, audio/visual (A/V) ports 212, a user input interface 214, input device(s) 216, a network interface 218 and a bus 220. The computing device 200 is only one example of a suitable computing device and is not intended to suggest any limitation as to the scope of use or functionality of the presently disclosed subject matter. Neither should the computing device 200 be interpreted as having any dependency or requirement relating to any one or combination of components illustrated in the exemplary computing system 200. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

The computing device 200 can includes a variety of computer readable media. Computer readable media can be any available media that can be accessed by computing device 200 and includes both volatile and nonvolatile media, removable and non-removable media. Such computer readable media is generally represented by the memory 204, which can include volatile and/or nonvolatile memory such as read only memory (ROM) and random access memory (RAM). The memory 204 can store, e.g., a basic input/output system (BIOS), data and/or program modules that are immediately accessible the processing unit 202. The memory 204 can also store an operating system, application programs, other program modules, and program data. The computing device 200 can also include other removable/non-removable, volatile/nonvolatile computer storage media, such as, but not limited to, a hard disk drive, nonvolatile magnetic media, a magnetic disk drive, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer device 200 through input device(s) 216 such as a keyboard and/or a pointing device, such as a mouse, trackball or touch pad. Such command can be used, e.g., to control an avatar in a virtual environment. Other exemplary input devices include a microphone, joystick, or game pad. These and other input devices can be connected to the processing unit(s) 202 through a user input interface 214 that is coupled to the bus 220, but may be connected by other interface and bus structures, such as a parallel port, game port or a universal serial bus (USB). It is also possible that an input device 216 includes one or more cameras and/or other capture devices that can recognize user motion and/or gestures using time-of-flight (TOF), structured light and/or other technologies. Examples of such input devices, which are commercially available, include the Kinect™ available from Microsoft Corporation (headquartered in Redmond, Wash., USA), the Play Station™ Camera available from Sony Corporation (headquartered in Tokyo, Japan) and the Senz3D™ available from Creative Technology Ltd (headquartered in Singapore). An input device 216 can also include one or more motion sensors, such as, but not limited to a gyroscope, an accelerometer and/or a magnetometer. An input device 216 can also include optical sensor technology.

A monitor or other type of display device 222 can be connected to the video codec 210 via audio/visual (A/V) ports 212 or some other video interface. Headphones, speakers or some other audio output device 224 can be connected to the audio codec 208 via the A/V ports 212 or some other audio interface. In specific embodiments, in order to enable a user to experience spatialized sound, the audio output device 224 provides for stereo sound, and more specifically, at least two-channel (e.g., left and right) audio, and potentially more than two-channel audio.

It is also possible that the computing device 200 is implemented as, or is connected to, a head mounted display (HMD) device that can be used to detect the orientation of the user's head, track a user's eye gaze, accept audio inputs from a user, display virtual worlds to a user, output stereo audio to a user, and/or the like. An exemplary HMD device should soon be available from Oculus VR, Inc. (headquartered in Irvine, Calif.), and other companies are also currently developing such devices.

The computing device 200 may operate in a networked environment using logical connections to one or more remote computers, which may be a personal computer, a server, a router, a network PC, a peer device or other common network node, and typically includes many or all of the elements described above relative to the computing device 200. The logical connections can include or be provided by a local area network (LAN) and/or a wide area network (WAN), but may also include other networks. Such networking environments are commonplace in offices, enterprise-wide computer networks, intranets and the Internet. When used in a LAN networking environment, the computing device 200 may be connected to the LAN through the network interface 218. When used in a WAN networking environment, the computing device 200 may include a modem or other means for establishing communications over the WAN, such as the Internet. Such a modem, which may be internal or external, may be connected to the bus 220 via the user input interface 216 or other appropriate mechanism. In a networked environment, program modules depicted relative to the computing device 200, or portions thereof, may be stored in the remote memory storage device.

Virtual Worlds and the Metaverse

As mentioned above, a metaverse is a collection of a plurality of virtual worlds. Explained another way, a metaverse refers to the collection of all the domains including and contained within a particular root domain. In an embodiment, an interactive client 150 can only be connected to a single virtual world at a time. There could be multiple independent virtual worlds. For example, there can be private virtual worlds that are not connected to the public Internet and/or are not contained within the "root" domain. Also, connecting to a sub-domain of a public space (and not to its parents) is the same as being connected to a virtual world consisting of only the contents of that domain. A virtual environment, as the term is used herein, can refer to a virtual world or to a metaverse.

Each virtual world can be thought of as a single volume, divided into a countless number of smaller and smaller cubes. A root domain is evenly divided to create 8 smaller cubes. Each of the smaller cubes is again subdivided in the same manner, with these subdivisions continuing as many times as desired. Some of these smaller cubes, corresponding to specific owned and operated locations in a virtual world, have text names and are called 'domains'.

More specifically, a domain, as the term is used herein, is an owned and operated region or cube of a virtual world, and more generally, of a metaverse. All domains, with the exception of the root domain, are located in and contained within a sub-region of a parent domain. More than just a region in the virtual world, a domain also refers to a bundled set of servers and network nodes providing "presence" services to connected interactive clients 150. These services include, but are not limited to: domain servers 122 (for managing and publishing details of connected services and nodes); voxel servers 128 (for persistence and rendering of visual content); audio-mixers 126 (for managing, mixing, and streaming of positional audio streams); and avatar mixers 126 (for managing, mixing, and streaming of interactive agent information). A region of a virtual world (and more generally of the metaverse) that is not yet owned and operated can be referred to as a voxel region. Once someone claims and names a voxel region, such a region becomes a domain.

In an embodiment, to exist as a virtual place (e.g., a virtual house) in a shared public virtual world, a user registers for a public domain. As mentioned above, a domain, as the term is used herein, is a named 3D cube in a virtual world that is owned and operated. A user can choose where they want that cube to be, given that either no one else is there, or if someone else is there, if the user has permission. It is also possible that a user can use virtual currency to buy or rent a domain from another user. In accordance with an embodiment, a user pays a fee for their domain, in a manner analogous to a user paying a fee for an internet domain. Such a fee, which can be an annual or monthly fee, but is not limited thereto, may be provided to the company that is providing the various global services 110 described herein. The database created by this registration process is read and used by the name server 112 to answer space lookups.

Figure 3:
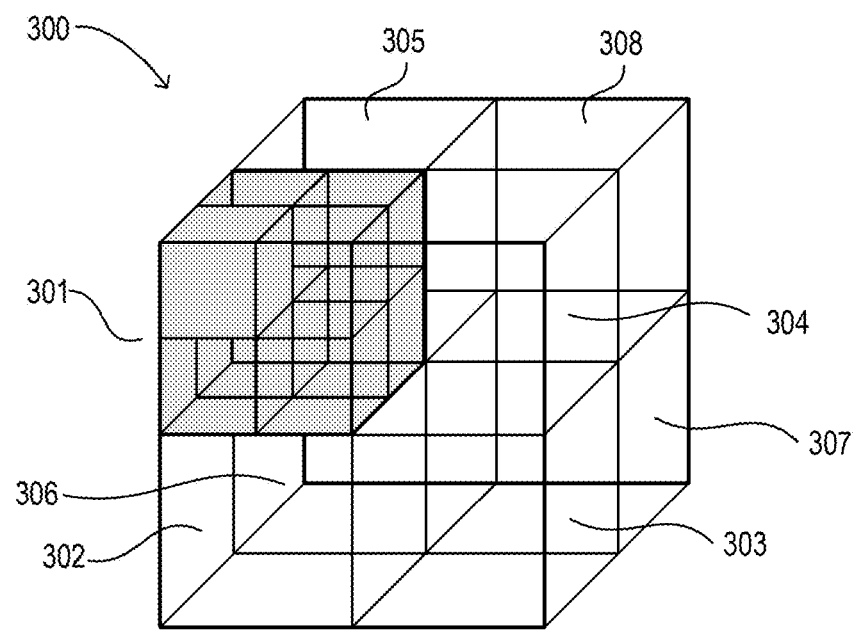
FIG. 3 illustrates how a large cube, representative of a virtual world, can be subdivided into cubes, which can then subdivided in the same way, without end, as needed.

As mentioned above, each virtual world can be represented as a single large 3D cube that can itself be infinitely subdivided, by dividing the cube in half along each of its three axes (i.e., x, y and z axes) to form eight more cubes. More specifically, a sparse voxel octree can be used to achieve the visual representation of a virtual world, with each 3D cube corresponding to a voxel. FIG. 3 illustrates how a large cube 300, representative of a virtual world, can be subdivided into eight more cubes 301, 302 . . . 308. Each of the cubes 301, 302 . . . 308 can then subdivided in the same way, without end, as needed. For example, the cube 301, which has been shaded, is shown as being subdivided into eight smaller cubes. Each of these eight smaller cubes can be similarly subdivided into eight even smaller cubes, and so on.

The origin of a virtual world can be thought of as being at one corner of the large 3D cube 300, with the edges of length one. There is nothing outside the large 3D cube 300. This large 3D cube representative of a virtual world does not 'exist' in any one physical space, but is persistently stored on a numerous computing devices across the Internet. In a manner similar to domain names, a computing device responsible for hosting the contents of any particular smaller cube may be found through a lookup. The domain server 122 can perform such a lookup.

The data defining each of the cubes or voxels can be stored on a decentralized network of computing devices which deliver requested blocks of voxels to requesting interactive clients 150. By summing groups of voxels hierarchically into larger and larger structures, and dynamically updating these summary voxels as changes are made, an entire virtual world can be continuously viewable from any distance, without a need to constrain draw distance. The continuous cost of computing changes to voxels can be part of how the large decentralized network/market of computing devices can be used.

Supporting Virtual Environments Using User Contributed Devices

Figure 4:
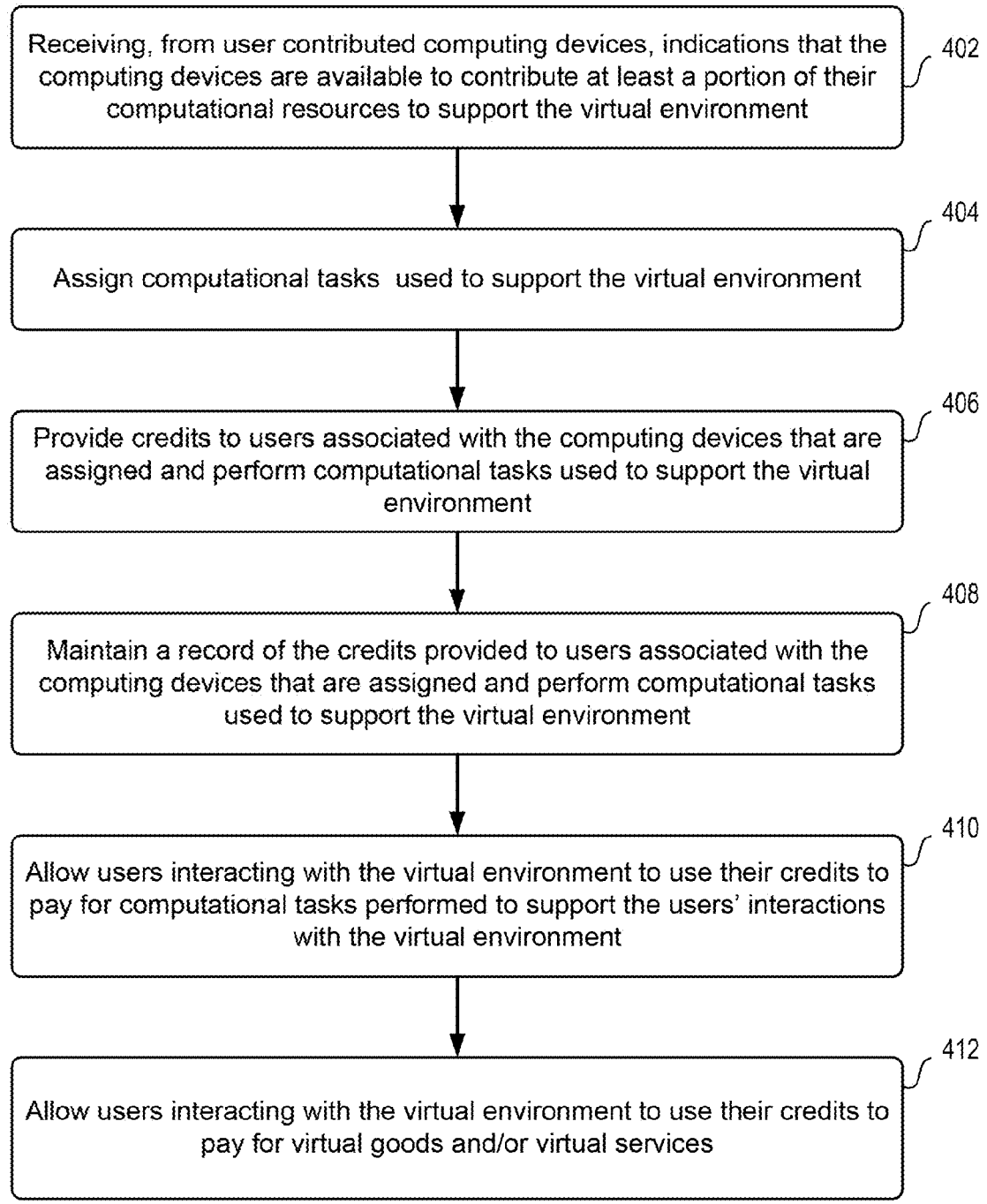
FIG. 4 is a high level flow diagram that is useful for explaining methods, according to certain embodiments of the present invention, for providing a computer-generated virtual environment that is at least partially supported by a plurality of user contributed computing devices.

FIG. 4 is a high level flow diagram that is useful for explaining methods for providing a computer-generated virtual environment that is at least partially supported by a plurality of user contributed computing devices 140. Referring to FIG. 4, at step 402, an indication is received, from each of a plurality of user contributed computing devices 140, that the computing device is available to contribute at least a portion of its computational resources to support the virtual environment. Depending upon implementation, such indications can be received by a domain server 122 (e.g., that implements an assignment server function) or a global assignment server 114. At step 404, at least some of the computing devices, from which the indications are received at step 402, are assigned computational tasks that are used to support the virtual environment. Such tasks can include, but are not limited to, a voxel-server related task, an avatar-mixer related task and an audio-mixer related task. Other types of tasks included, but are not limited to, scripting agent tasks.

Still referring to FIG. 4, at step 406, credits are provide to users associated with the computing devices that are assigned and perform computational tasks used to support the virtual environment. In accordance with an embodiment, how many credits are provided to a user is based on a length of time that the computing device, associated with the user, performs one or more computational tasks used to support the virtual environment. Alternatively, or additionally, how many of credits are provided to a user can be based on how many computational tasks the computing device, associated with the user, performs to support the virtual environment. How many credits are provide to a user can alternatively, or additionally, be dependent on the quality and/or reliability of the computational tasks the computing device, associated with the user, performs to support the virtual environment. Quality can be a measure of accuracy and/or other factors, and can be determined, in an embodiment, through redundant task assignments (whereby multiple devices independently perform the same task, with their results compared) and/or using other auditing techniques. A user can be associated with a computing device, e.g., if the user owns and/or operates the computing device. For a more specific example, a teenager may be associated with a computing device, even if the actual owner of the computing device is the teenager's parent.

Step 408 involves maintaining a record of the credits provided to users associated with the computing devices that are assigned and perform computational tasks used to support the virtual environment. Step 408 can be performed, e.g., by the currency server 118.

Step 410 involves allowing users that interact with the virtual environment to use their credits to pay for computational tasks performed to support the users' interactions with the virtual environment. Such tasks can include, but are not limited to, a voxel-server related task, an avatar-mixer related task and an audio-mixer related task. Additionally, or alternatively, a user may be allowed to use their credits to pay for virtual goods and/or virtual services, as indicated at step 412. In certain embodiments, a first user, which is interacting with a domain that is owned by a second user, can use their credits to pay the second user for interacting with the domain that is owned by the second user. In certain embodiments, the aforementioned credits can be units of a virtual currency. Alternatively, the aforementioned credits can be exchanged for virtual currency. Either way, the earned credits have a value that can be used to enable a user to participate in a virtual environment and/or enhance their participation in the virtual environment.

Audio-Mixers

Figure 5:
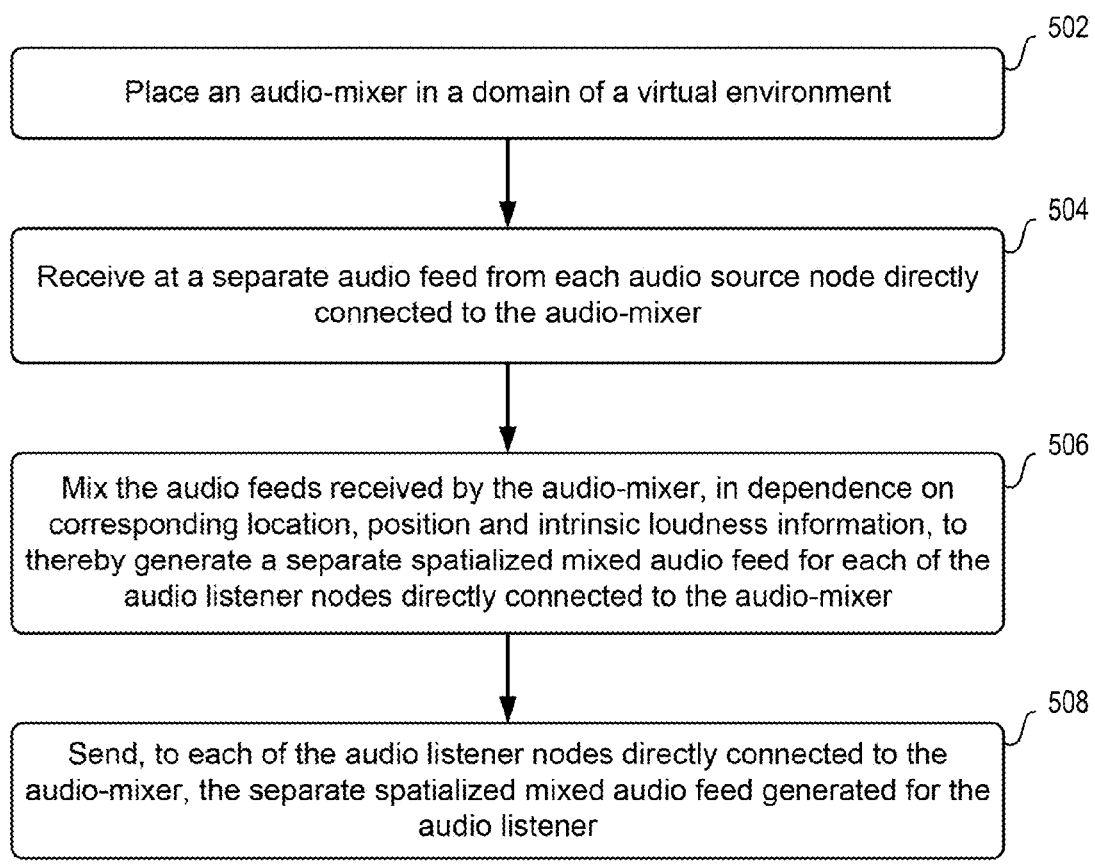
FIG. 5 is a high level flow diagram that is used to explain methods, according to specific embodiments of the present invention, for providing an immersive audio experience in a computer-generated virtual environment.

FIG. 5 is a high level flow diagram that is used to explain methods, according to specific embodiments of the present invention, for providing an immersive audio experience in a computer-generated virtual environment. Such methods can be used, e.g., with a virtual environment that includes one or more domains, wherein each of the domains includes at least two audio source nodes and at least two audio listener nodes. Exemplary audio sources (which can also be referred to as audio source nodes), include, but are not limited to, speech or other noises originating from avatars, music originating from virtual bands or virtual stereos, and virtual environmental noises such as virtual thunder, wind, street noises, ocean noises, and the like. In an embodiment, an audio source node and an audio listener node can be the same node. For example, an avatar (controlled by a user of an interactive client) can be both an audio source node and an audio listener node, and thus, can also be referred to as an audio source/listener node, or simply a source/listener node. An audio-injector, examples of which were provided above, is an audio source node that is not also an audio listener node. A virtual microphone is an example of an audio listener node that is not also an audio source node.

Referring to FIG. 5, at step 502 an audio-mixer (e.g., 124) is placed at a location in a domain of the virtual environment. Explained another way, an audio-mixer is treated as having a location within a domain of a virtual world, wherein the location of the audio-mixer can be determined by the domain server (e.g., 122) responsible for that domain. In the real world, sound intensity decreases geometrically with distance between the source of the sound and the listener. Placing an audio-mixer 124 at a virtual location within a domain enables virtual distances between the audio-mixer and audio listening nodes to be calculated, which in-turn enables the intensity of a sound at a point of perception (e.g., the virtual location of an audio listener node) to be calculated. Such intensity of a sound at a point of perception can also be referred to as the apparent loudness. Various embodiments for determining the location of an audio-mixer 124 are described below with reference to FIGS. 6A-6D and 7. Further, as described in additional detail below, multiple audio-mixers 124 can be assigned to the same domain, e.g., where there are more audio source nodes in a domain than a single audio-mixer can handle. Step 502 can be performed, e.g., by a domain server 122 responsible for the domain within which an audio-mixer 124 is located.

At step 504, the audio-mixer 124 receives a separate audio feed from each of the audio source nodes directly connected to the audio-mixer. Such audio feeds can be compressed, but need not be. Further, as will be described in additional details below, an audio-mixer can also receive mixed audio feeds from other audio-mixers, and send mixed audio feeds to other audio-mixers. For the purpose of this description, an audio source is considered directly connected to an audio-mixer, and vice versa, if the audio-mixer receives an audio feed directly from the audio source node. Similarly, an audio listener node is considered directly connected to an audio-mixer, and vice versa, if the audio-mixer sends a mixed audio feed directly to the audio listener node. If an audio-mixer receives an audio feed from an audio source node, only after that audio feed has been mixed into a mixed audio feed by another audio-mixer, then the audio source node and audio-mixer are not considered directly connected. Similarly, if an audio listener node receives a mixed audio feed directly from an audio-mixer, where the mixed audio feed was generated in part based on a further mixed audio feed received from a further audio-mixer, then the audio listener node and the further audio-mixer are not considered to be directly connected. More generally, the term directly connected does not refer to an actual physical connection, but rather, specifies whether an audio listener (and/or source) node and an audio-mixer transfer audio feeds between one another without another audio-mixer first intercepting the audio feed and mixing it together with one or more other audio feeds.

In an embodiment, each of the audio feeds received from an audio source node at step 504 includes corresponding location information, corresponding position information and corresponding intrinsic loudness information. The location information is indicative of a location of the audio source node in the virtual environment. The position information is indicative of a position of the audio source node in the virtual environment. The intrinsic loudness information is indicative of an intensity of sound at the audio source node in the virtual environment.

At step 506, the audio-mixer mixes the audio feeds received by the audio-mixer, in dependence on the corresponding location, position and intrinsic loudness information, to thereby generate a separate spatialized mixed audio feed for each of the audio listener nodes directly connected to the audio-mixer. Preferably, when generating a custom spatialized mixed audio feed for an audio listener directly connected to the audio-mixer, the audio-mixer also mixes the audio feeds received by the audio-mixer in dependence on the location and position of the audio listener node for which the spatialized mixed audio feed is being generated.

In accordance with an embodiment, the mixed audio feeds, generated for the audio listener nodes at step 506, include left channel audio data and right channel audio data having a phase delay therebetween that is used to simulate sound having to travel different distances to reach different portions of the one of the audio listener nodes. Such different portions of an audio listener node can correspond, e.g., to left and right ears of an avatar. In such an embodiment, step 506 can also include determining the phase delay between the left channel audio data and the right channel in dependence on the position of an audio listener node.

At step 508, the audio-mixer sends, to each of the audio listener nodes directly connected to the audio-mixer, the separate spatialized mixed audio feed generated for the audio listener. Each of the spatialized mixed audio feeds is customized for a specific audio listener node, to provide a realistic immersive audio experience for a user associated with the audio listener node. Such spatialized mixed audio feeds, which include data packets, can be converted to specialized analog audio signals (e.g., by an audio codec 208) that can then drive audio headphones or speakers so that users can hear the specialized audio.

As mentioned above, an audio-mixer can also receive mixed audio feeds from other audio-mixers, and send mixed audio feeds to other audio-mixers. In accordance with an embodiment, the mixed audio feeds sent between audio-mixers are non-spatialized mixed audio feeds. For example, step 504 can also include receiving a non-spatialized mixed audio feed from another audio-mixer, in which case step 506 would also include mixing the non-spatialized mixed audio feed, received from the other audio mixer, with the audio feeds received from the audio source nodes directly connected to the audio-mixer, when generating the separate spatialized mixed audio feed for each of the audio listener nodes directly connected to the audio-mixer. Even though the audio feed received from the other audio-mixer is non-spatialized, it can still include corresponding location information indicative of a location of the other audio-mixer in the virtual environment. This enables the mixing at step 506 to also be performed in dependence on the location information of the other audio-mixer from which the non-spatialized mixed audio feed is received.

As mentioned above, an audio-mixer can send non-spatialized mixed audio feeds to other audio-mixers. In an embodiment, in order to do so, the audio-mixer first mixes the audio feeds received by the audio-mixer, independent of the location, position and intrinsic loudness information corresponding to the receive audio feeds, to generate the non-spatialized mixed audio feed. In other words, an audio-mixer can generate a non-spatialized mixed audio feed by mixing together all the audio feeds it receives with the same intensity level and without taking into account the locations and positions of the audio sources from which the audio feeds are received. This has the effect of removing details, which simulates what happens in the real world when a person listens to a group of people that are relatively far away from the person. For example, in the real world, audio from the group of people located relatively far away would sound like it was all coming from a same point in space with details of individual sounds (e.g., voices) difficult to decipher. The audio-mixer can then send the non-spatialized mixed audio feed to at least one other audio-mixer.

In certain embodiments, the aforementioned non-spatialized mixed audio feed can include location information indicative of the location of the audio-mixer sending the non-spatialized mixed audio feed, for the purpose mentioned above. In certain embodiments, the non-spatialized mixed audio feed can include intrinsic loudness information that can indicate an average intrinsic loudness of the audio feeds mixed together, which can be used along with location information to determine how loud to mix in the non-spatialized mixed audio feed with other audio feeds.

In certain embodiments, an audio-mixer receiving a non-spatialized mixed audio feed (from another audio-mixer) can mix that audio feed with one or more other non-spatialized mixed audio feeds (received from other audio-mixers) and audio feeds received from directly connected audio sources to generate its own non-spatialized mixed audio feed that can be sent on to still other audio-mixers. In other words, non-spatialized mixed audio feeds can be sent up and down a hierarchical tree of audio-mixers, wherein each time a non-spatialized mixed audio feed gets mixed into to a further mixed audio feed its intrinsic loudness is attenuated to simulate that audio feed traveling a further distance. Additionally, the latency caused each time a mixed audio feed is mixed with other audio feeds can simulate real world latency that occurs when audio travels over a distance (e.g., in the real would it takes sound about 5 seconds for audio to travel 1 mile in air at sea level).

Additional details of how to determining the location at which to place an audio mixer 124, at step 502, will now be described with reference to FIGS. 6A-6D and 7.

In an embodiment, where only one audio-mixer 124 is servicing an entire domain, the location of the audio-mixer can be the center of the domain. For example, if it is assumed that a domain corresponds to a cube having edges that are each 1 unit in length, then the center of the domain can be at the position x=0.5 units, y=0.5 units and z=0.5 units. Alternatively, the location of the audio-mixer 124 can be center of the positions of all the audio sources in the domain to which the audio-mixer is directly connected. This will provide a more accurate apparent source, when a mixed audio feed from that audio-mixer is provided to another audio-mixer for mixing with audio feeds received from other audio sources. The center of all the audio sources to which an audio-mixer is directly connected can be determined, e.g., by determining the average x, y and z coordinates for directly connected audio sources, but is not limited thereto.

Where there are multiple audio-mixers 124 serving a same domain, there are various different ways to determine the positions of the audio-mixers within the domain. For example, if there are eight audio mixers servicing a single domain, then the domain can be subdivided into eight equally (or differently) sized subdomains and the audio mixers can be positioned at the centers of the subdomains.

Alternatively, because each of the audio-mixers will only be directed connected to some of the audio sources within the domain, each audio-mixer can be positioned at the center of the positions of the audio sources directly connected to that audio-mixer.

Figure 6A:
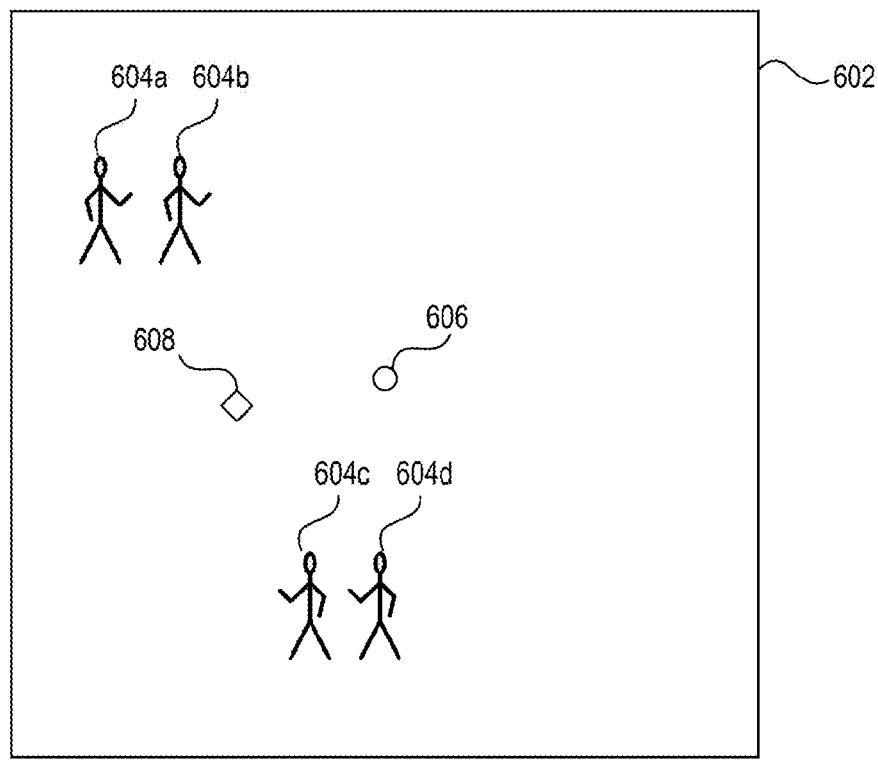
FIGS. 6A-6D are used to further explain certain embodiments for placing an audio-mixer at a location within a domain of a virtual environment, as well selectively moving the location of the audio-mixer.

FIG. 6A is includes a large square 602 which is illustrative of the boundary of a domain or subdomain being serviced by an audio-mixer 124. Also shown in FIG. 6A are four avatars 604a, 604b, 604c and 604d within the domain or subdomain 602. The circle 606 corresponds to the center of the domain or subdomain 602, and thus, a potential location for an audio-mixer 124. The diamond 608 corresponds to the center of the locations of the four avatars 604a, 604b, 604c and 604d, and thus, another potential location for an audio-mixer 124.

There is a limit to the number of audio sources and listeners that a single audio-mixer 124 can support. In other words, there is a limit to the number of audio sources and audio listeners that can be directly connected to an audio-mixer 124. This limit, which may be primarily driven by network bandwidth throughput limits, can be, e.g., a number between 20 and 100, but is not limited thereto.

When an audio-mixer 124 updates its status to a domain server 122, the audio-mixer 124 informs the domain server 122 of the number of additional audio feeds that the audio-mixer 124 can handle as part of the status update. When there are more audio source/listener nodes located in a domain than a single audio-mixer can handle, the domain server 122 will assign one or more additional audio-mixers 124 to that domain. Where there is a desire to support numerous (e.g., tens of thousands to millions of) interactive agents in a single domain, audio-mixers are preferably load balanced.

To achieve of the load balancing, a domain server 122 may dynamically reconfigure or modify which audio sources and audio listeners are directed to which audio-mixers 124. It is also possible that there may be changes to the list of audio sources that are directly connected to an audio mixer 124 for other reasons, such as because a user controlling an avatar moved their avatar into a different domain (or portion thereof), or logged out, are another user controlling another avatar moved their avatar into the domain (or portion thereof) being serviced by the audio mixer 124 or just logged in.

In accordance with an embodiment, when direct connections between audio-mixers 124 and audio sources and audio listeners are dynamically changed, the locations of the audio-mixers 124 are changed in dependence on whatever technique is used to determine the location of audio-mixers. For example, in an embodiment where an audio-mixer 124 is located at the center of all the audio-sources directly connected to that audio-mixer, when the list of audio sources directly connected to the audio-mixer changes, the center of the directly connected audio sources will change, which in effect will cause the location of the audio-mixer 124 to change. For another example, in an embodiment where a domain is subdivided into equally (or differently) sized subdomains and audio mixers are positioned at the centers of the subdomains, when the sizes of the subdomains change and/or subdomains are further subdivided, the locations of the centers of the subdomains will change, which in effect will cause the locations of the audio-mixers to change.

Figure 6B:
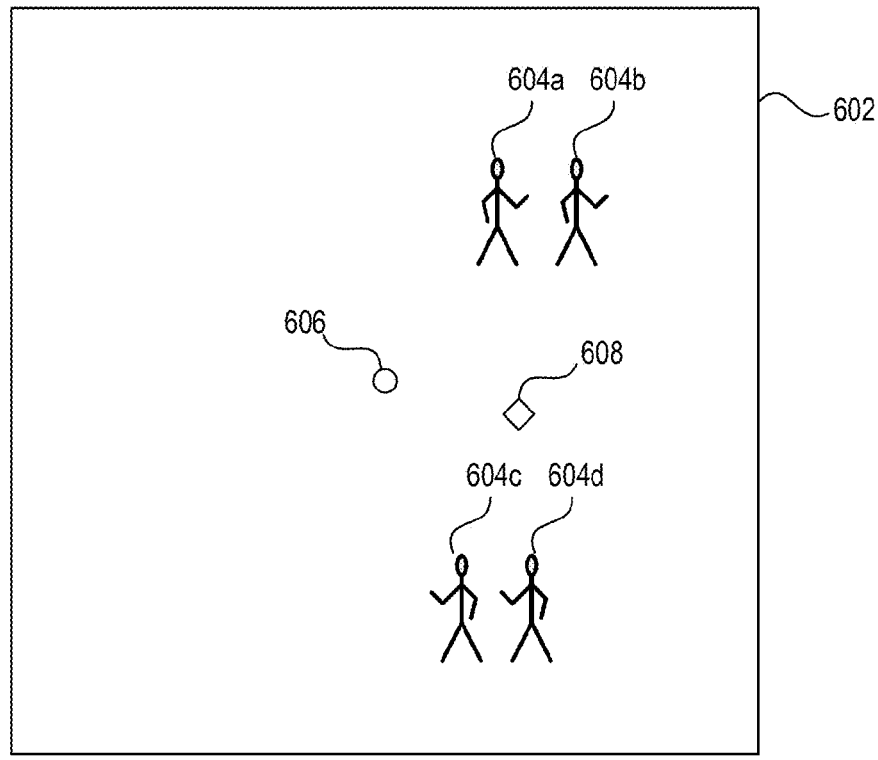

In accordance with an embodiment, when one or more audio sources directly connected to an audio-mixer changes its location (e.g., because an avatar moves from one location to another), the location of the audio-mixer is changed so that the location of the audio-mixer remains at the center of the audio-sources directly connected to the audio-mixer. The location of an audio-mixer can be changed, e.g., whenever the location of a directly connected audio source changes, periodically, or whenever the location of a directly connected audio source changes by at least a threshold distance, but is not limited thereto. FIG. 6B illustrates how the center of the locations of the four avatars 604a, 604b, 604c and 604d, represented by the diamond 608, changes as the location of one or more of the avatars 604a, 604b, 604c and 604d changes (relative to FIG. 6A), and thus how the location of the audio-mixer 124 can change.

Figure 6C:
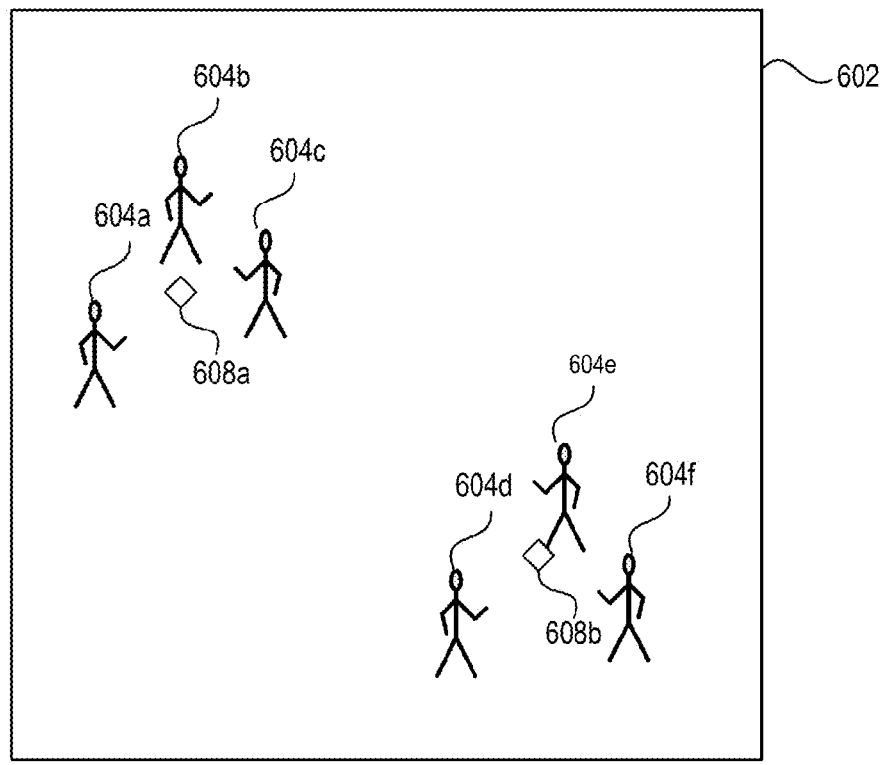

FIG. 6C illustrates an embodiment where two audio-mixers 124, represented by diamonds 608a and 608b, are servicing a same domain represented by the large square 602. More specifically, the audio-mixer represented by the diamond 608a is located at the center of the locations of the audio sources (represented by the avatars 604a, 604b and 604c) directly connected thereto; and the audio-mixer represented by the diamond 608b is located at the center of the locations of the audio sources (represented by the avatars 604d, 604e and 604f) directly connected thereto.

Figure 6D:
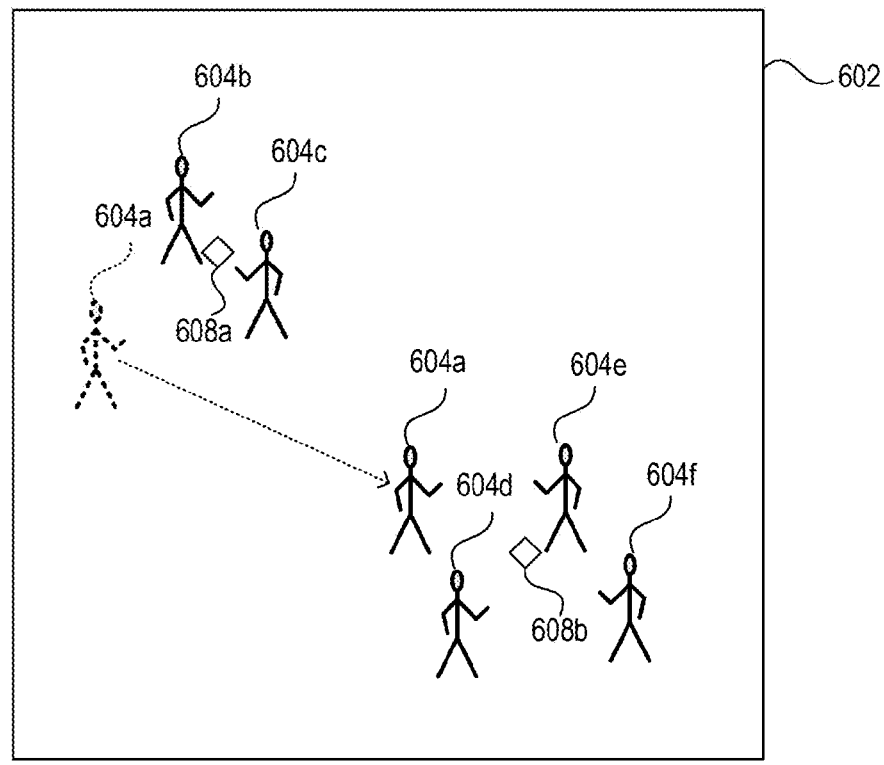

In accordance with an embodiment, as audio sources move around a domain, one or more direct connections between the audio sources and audio-mixers is/are changed so that each audio source is connected to the closest audio-mixer. This will have the effect of providing audio listeners within the domain with a more accurate positional audio experience. This embodiment can be better understood with reference to FIGS. 6C and 6D. FIG. 6C was already described above. FIG. 6D shows that the avatar 604d has moved from a location close to the audio-mixer represented by the diamond 608a to a location close to the audio-mixer represented by the diamond 608b. During this move, the location of the audio-mixer represented by the diamond 608a may have been moved to keep it at the center of the avatars directly connected thereto. However, there eventually comes a point where, rather than keep moving the location of the audio-mixer represented by the diamond 608a, a better audio experience would be achieved by disconnecting the avatar 604a from the audio-mixer represented by the diamond 608a, and directly connected the avatar 604a to the audio-mixer represented by the diamond 608b. Note that the location of the audio-mixer represented by the diamond 608b has also been moved to be at the center of the four avatars 604a, 604e, 604d and 604f now directly connected to the audio-mixer. Additionally, the location of the audio-mixer represented by the diamond 608a has also been moved to be at the center of the only two remaining avatars 604b and 604c now directly connected to the audio-mixer.

Figure 7:
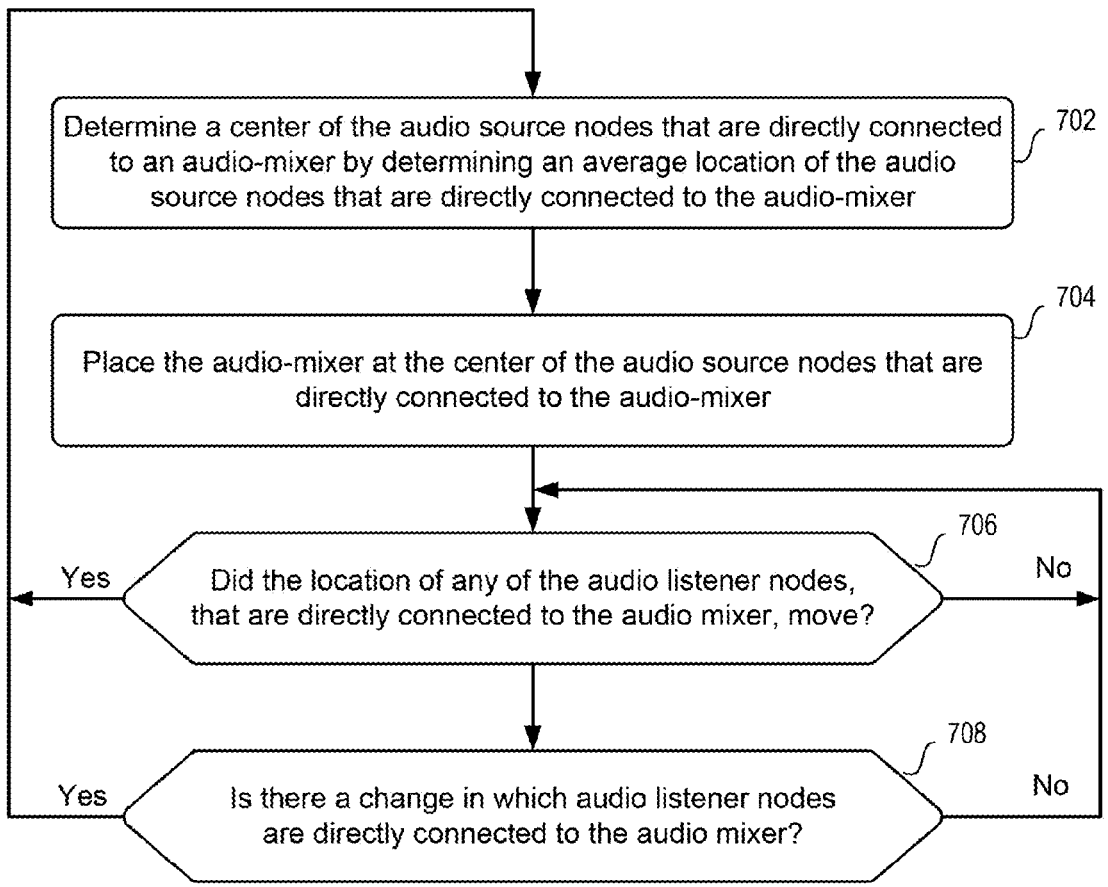
FIG. 7 is a high level flow diagram that is used to summarize certain embodiments for placing an audio-mixer at a location within a domain of a virtual environment.

FIG. 7 is a high level flow diagram that is used to summarize certain embodiments for placing audio-mixers at a location within a domain. Referring to FIG. 7, at step 702 a center of the audio source nodes that are directly connected to an audio-mixer is determined, e.g., by determining an average location of the audio source nodes that are directly connected to the audio-mixer. For example, where each audio source node has x, y and z coordinates, an average x coordinate, an average y coordinate and an average z coordinate can be determined. As indicated at step 704, the audio mixer is placed at the center of the audio source nodes that are directly connected to an audio-mixer. Preferably, as indicated at step 706, the center of the audio source nodes (that are directly connected to an audio-mixer) is redetermined from time-to-time to account for the center of the audio source nodes changing when a location of one or more of the audio listener nodes changes, and the audio-mixer is moved to the redetermined center of the audio source nodes (that are directly connected to an audio-mixer). This can occur periodically, or in response to an event, such as in response to one of the directly connected audio listener nodes moving, but is not limited thereto. As indicated at step 708, the center of the audio source nodes (that are directly connected to an audio-mixer) can also redetermined from time-to-time to account for the center of the audio source nodes changing when there is a change in which audio source nodes are directly connected to the audio-mixer. This can occur periodically, or in response to an event, such as in response to an audio-mixer dropping one of its directly connected audio source nodes or obtaining a new directly connected audio source node. This can also occur in response to one or more additional audio-mixers being placed in a domain of the virtual environment when the one or more audio-mixers already placed in the domain individually or collectively reach a specified capacity threshold. As explained above, when at least two audio-mixers are placed in a domain, there can be a selective changing of which of the audio listener nodes are directly connected to which of the audio-mixers to account for one or more of the audio listener nodes changing their location within the domain and/or to perform load balancing.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A method for supporting a computer-generated multi-avatar interactive virtual world using user contributed computing devices that operate in a networked environment, the method comprising:
   (a) receiving via the networked environment, from each of a plurality of the user contributed computing devices, an indication that the computing device is available to contribute at least a portion of its computational resources to support the multi-avatar interactive virtual world;
   (b) assigning via the networked environment, to each of at least some of the computing devices from which said indications are received, a computational task that is used to support the multi-avatar interactive virtual world;
   (c) providing credits to users associated with the computing devices that are assigned and perform the computational tasks used to support the multi-avatar interactive virtual world;
   (d) maintaining a record of the credits provided to the users associated with the computing devices that are assigned and perform the computational tasks used to support the multi-avatar interactive virtual world; and
   (e) supporting the users' interactions with the multi-avatar interactive virtual world, by allowing the users that interact with the multi-avatar interactive virtual world to use their credits to have further computational tasks performed to support the users' interactions with the multi-avatar interactive virtual world;
      wherein the further computational tasks that are performed to support the users' interactions with the multi-avatar interactive virtual world at step (e) are selected from the group consisting of: a voxel-server related task that supports at least one of persistence or rendering of visual content associated with the multi-avatar interactive virtual world; an avatar-mixer related task that supports at least one of managing, mixing or streaming of interactive agent information associated with the multi-avatar interactive virtual world; and an audio-mixer related task that supports at least one of managing, mixing or streaming of a positional audio stream associated with the multi-avatar interactive virtual world.

2. The method of claim 1, further comprising:
   (f) allowing the users interacting with the multi-avatar interactive virtual world to exchange at least some of their credits for virtual goods and/or virtual services.

3. The method of claim 1, wherein a same one of the computing devices that is used to perform an assigned computational task during a first period of time, is used by a user to interact with the multi-avatar interactive virtual world during a second period of time.

4. The method of claim 1, wherein at step (c) how many credits are provided to a user is based on a length of time that the computing device, associated with the user, performs one or more of the computational tasks used to support the multi-avatar interactive virtual world.

5. The method of claim 1, wherein at step (c) how many credits are provided to a user is based on how many of the computational tasks the computing device, associated with the user, performs to support the multi-avatar interactive virtual world.

6. The method of claim 1, wherein at step (c) how many credits are provided to a user is based on a measure of quality of one or more of the computational tasks the computing device, associated with the user, performs to support the multi-avatar interactive virtual world.

7. The method of claim 6, further comprising determining the measure of quality of one or more of the computational tasks the computing device, associated with the user, performs to support the multi-avatar interactive virtual world.

8. The method of claim 1, wherein:
the multi-avatar interactive virtual world includes one or more domains, with each domain supported by one or more voxel-servers, one or more avatar-mixers and one or more audio-mixers; and
the computational tasks that are assigned to at least some of the computing devices at step (b) are selected from the group consisting of
   a said voxel-server related task that supports at least one of persistence or rendering of visual content associated with the multi-avatar interactive virtual world;
   a said avatar-mixer related task that supports at least one of managing, mixing or streaming of interactive agent information associated with the multi-avatar interactive virtual world; and a said audio-mixer related task that supports at least one of managing, mixing or streaming of a positional audio stream associated with the multi-avatar interactive virtual world.

9. The method of claim 1, wherein the multi-avatar interactive virtual world includes domains that are owned by different ones of the users, and further comprising:
allowing one of the users that owns one of the domains to exchange at least some of their credits for one or more of the computational tasks that are performed to support the one of the domains owned by the one of the users.

10. The method of claim 1, wherein the multi-avatar interactive virtual world includes one or more domains that are owned by users, and further comprising:
allowing a first user, which is interacting with a domain that is owned by a second user, to transfer at least some of their credits to the second user in exchange for said interacting with the domain that is owned by the second user.

11. The method of claim 1, wherein a said computational task that is assigned at step (b) is used to support at least one service of the multi-avatar interactive virtual world that is accessible to a plurality of interactive clients.

12. The method of claim 1, wherein a said computational task that is assigned at step (b) comprises one of: a said voxel-server related task that supports at least one of persistence or rendering of visual content associated with the multi-avatar interactive virtual world; a said avatar-mixer related task that supports at least one of managing, mixing or streaming of interactive agent information associated with the multi-avatar interactive virtual world; or a said audio-mixer related task that supports at least one of managing, mixing or streaming of a positional audio stream associated with the multi-avatar interactive virtual world.

13. The method of claim 1, further comprising receiving results of the computational tasks from the computing devices that are assigned and perform the computational tasks, and using the results to support the multi-avatar interactive virtual world.

14. A system for supporting a computer-generated multi-avatar interactive virtual world that includes a plurality of domains, the system comprising:
a plurality of domain servers, wherein each domain server of the plurality of domain servers is associated with one of the domains of the multi-avatar interactive virtual world and is adapted to
interact with computing devices controlled by users that are interacting with contents of the one of the domains associated with the domain server; and
receive, from each of a plurality of user contributed computing devices, an indication that the computing device is available to contribute at least a portion of its computational resources to support the multi-avatar interactive virtual world;
an assignment server adapted to
receive requests for computational resources from the domain servers;
assign, to each of at least some of the computing devices from which said indications are received, a computational task that is used to support the multi-avatar interactive virtual world; and
provide credits to users associated with the computing devices that are assigned and perform the computational tasks used to support the multi-avatar interactive virtual world; and a currency server adapted to maintain a record of the credits provided to the users associated with the computing devices that are assigned and perform the computational tasks used to support the multi-avatar interactive virtual world;
wherein the domain servers, the assignment server and the currency server are configured to support the users' interactions with the multi-avatar interactive virtual world, by allowing the users that interact with the multi-avatar interactive virtual world to use their credits to have further computational tasks performed to support the users' interactions with the multi-avatar interactive virtual world; and
wherein the further computational tasks that are performed to support the users' interactions with the multi-avatar interactive virtual world are selected from the group consisting of: a voxel-server related task that supports at least one of persistence or rendering of visual content associated with the multi-avatar interactive virtual world; an avatar-mixer related task that supports at least one of managing, mixing or streaming of interactive agent information associated with the multi-avatar interactive virtual world; and an audio-mixer related task that supports at least one of managing, mixing or streaming of a positional audio stream associated with the multi-avatar interactive virtual world.

15. The system of claim 14, wherein:
each domain is supported by one or more voxel-servers, one or more avatar-mixers and one or more audio-mixers; and
the computational tasks that are assigned by the assignment server to at least some of the computing devices are selected from the group consisting of: a said voxel-server related task that supports at least one of persistence or rendering of visual content associated with the multi-avatar interactive virtual world; a said avatar-mixer related task that supports at least one of managing, mixing or streaming of interactive agent information associated with the multi-avatar interactive virtual world; and a said audio-mixer related task that supports at least one of managing, mixing or streaming of a positional audio stream associated with the multi-avatar interactive virtual world.

16. The system of claim 14, wherein the currency server is also adapted to allow users interacting with the multi-avatar interactive virtual world to exchange at least some of their credits for virtual goods and/or virtual services.

17. The system of claim 14, wherein a same one of the computing devices that is used to perform an assigned computational task during a first period of time, is used by a user to interact with the multi-avatar interactive virtual world during a second period of time.

18. A system for supporting a computer-generated multi-avatar interactive virtual world that includes a plurality of domains, the system comprising:
a plurality of domain servers, wherein each of the domain servers is associated with one of the domains of the multi-avatar interactive virtual world and is adapted to
interact with computing devices controlled by users that are interacting with contents of the domain associated with the domain server;
receive, from each of a plurality of the computing devices, an indication that the computing device is available to contribute at least a portion of its computational resources to support the multi-avatar interactive virtual world;

assign, to each of at least some of the computing devices from which said indications are received, a computational task that is used to support the multi-avatar interactive virtual world; and provide credits to users associated with the computing devices that are assigned and perform the computational tasks used to support the multi-avatar interactive virtual world; and a currency server adapted to maintain a record of the credits provided to the users associated with the computing devices that are assigned and perform the computational tasks used to support the multi-avatar interactive virtual world;

wherein the domain servers and the currency server are configured to support the users' interactions with the multi-avatar interactive virtual world, by allowing the users that interact with the multi-avatar interactive virtual world to use their credits to have further computational tasks performed to support the users' interactions with the multi-avatar interactive virtual world; and wherein the computational tasks that are assigned to at least some of the computing devices, and the further computational tasks that are performed to support the users' interactions with the multi-avatar interactive virtual world are selected from the group consisting of: a voxel-server related task that supports at least one of persistence or rendering of visual content associated with the multi-avatar interactive virtual world; an avatar-mixer related task that supports at least one of managing, mixing or streaming of interactive agent information associated with the multi-avatar interactive virtual world; and an audio-mixer related task that supports at least one of managing, mixing or streaming of a positional audio stream associated with the multi-avatar interactive virtual world.

19. The system of claim 18, wherein the currency server is also adapted to allow users interacting with the multi-avatar interactive virtual world to exchange at least some of their credits for virtual goods and/or virtual services.

20. The system of claim 18, wherein a same one of the computing devices that is used to perform an assigned computational task during a first period of time, is used by a user to interact with the multi-avatar interactive virtual world during a second period of time.

21. The system of claim 18, wherein the currency server is adapted to determine how many credits are provided to a user based on at least one of the following:

a length of time that the computing device, associated with the user, performs one or more of the computational tasks used to support the multi-avatar interactive virtual world;

how many of the computational tasks the computing device, associated with the user, performs to support the multi-avatar interactive virtual world; or a measure of quality of one or more of the computational tasks the computing device, associated with the user, performs to support the multi-avatar interactive virtual world.

22. One or more processor readable storage devices having instructions encoded thereon which when executed cause one or more processors to perform a method for supporting a computer-generated multi-avatar interactive virtual world using user contributed computing devices that operate in a networked environment, the method comprising:

(a) receiving via the networked environment, from each of a plurality of the user contributed computing devices, an indication that the computing device is available to contribute at least a portion of its computational resources to support the multi-avatar interactive virtual world;

(b) assigning via the networked environment, to each of at least some of the computing devices from which said indications are received, a computational task that is used to support the multi-avatar interactive virtual world;

(c) providing credits to users associated with the computing devices that are assigned and perform the computational tasks used to support the multi-avatar interactive virtual world;

(d) maintaining a record of the credits provided to the users associated with the computing devices that are assigned and perform the computational tasks used to support the multi-avatar interactive virtual world; and (e) supporting the users' interactions with the multi-avatar interactive virtual world, by allowing the users that interact with the multi-avatar interactive virtual world to use their credits to have further computational tasks performed to support the users' interactions with the multi-avatar interactive virtual world;

wherein the computational tasks that are assigned to at least some of the computing devices at step (b), and the further computational tasks that are performed to support the users' interactions with the multi-avatar interactive virtual world at step (e), are selected from the group consisting of: a voxel-server related task that supports at least one of persistence or rendering of visual content associated with the multi-avatar interactive virtual world; an avatar-mixer related task that supports at least one of managing, mixing or streaming of interactive agent information associated with the multi-avatar interactive virtual world; and an audio-mixer related task that supports at least one of managing, mixing or streaming of a positional audio stream associated with the multi-avatar interactive virtual world.

* * * * *

UNITED STATES PATENT AND TRADEMARK OFFICE
CERTIFICATE OF CORRECTION

PATENT NO. : 10,086,285 B2  
APPLICATION NO. : 14/273327  
DATED : October 2, 2018  
INVENTOR(S) : P. Rosedale et al.

Page 1 of 2

It is certified that error appears in the above-identified patent and that said Letters Patent is hereby corrected as shown below:

On the Title Page

Item (57), Abstract, Line 11: After "are" and before "to" delete "provide" and insert -- provided --.

In the Specification

Column 1, Lines 16-17: After "a" and before "environment" delete "computer-generate" and insert -- computer-generated --.
Column 1, Line 23: After "which" and before "in" delete "is".
Column 1, Line 33: After "able" and before "perceive" insert -- to --.
Column 2, Line 12: After "visual" and before "audio" delete "an" and insert -- and --.
Column 2, Line 35: After "are" and before "to" delete "provide" and insert -- provided --.
Column 2, Lines 46-47: After "are" and before "to" delete "provide" and insert -- provided --.
Column 3, Line 4: After "and" and before "for" delete "method" and insert -- methods --.
Column 3, Lines 63-64: After "then" and before "the" delete "sending" and insert -- send --.
Column 4, Lines 23-24: After "then" and before "subdivided" insert -- be --.
Column 4, Line 36: After "well" and before "selectively" insert -- as --.
Column 6, Line 28: After "above," and before "a" delete "one" and insert -- once --.
Column 10, Line 59: After "client" and before "can" delete "124" and insert -- 150 --.
Column 11, Line 6: After "objects" and before "do" delete "that that" and insert -- that --.
Column 12, Lines 1-2: After "fountain" and before "shoots" delete "that that" and insert -- that --.
Column 12, Line 41: After "mixing" and before "total" delete "at" and insert -- a --.
Column 12, Line 63: After "relatively" and before "to" delete "closed" and insert -- close --.
Column 13, Line 21: After "audio-mixer" and before "etc." delete "126," and insert -- 124, --.
Column 13, Line 22: After "may" and before "in" delete "processes" and insert -- process --.
Column 13, Lines 23-24: After "per" and before "but" delete "seconds," and insert -- second, --.
Column 14, Line 4: After "can" and before "a" delete "includes" and insert -- include --.
Column 15, Line 24: After "interface" and before "or" delete "216" and insert -- 214 --.
Column 15, Line 63: After "audio-mixers" and before "for" delete "126" and insert -- 124 --.
Column 16, Lines 39-40: After "on" and before "numerous" delete "a".

Signed and Sealed this  
Eleventh Day of December, 2018

Andrei Iancu  
*Director of the United States Patent and Trademark Office*

CERTIFICATE OF CORRECTION (continued)
U.S. Pat. No. 10,086,285 B2

Column 17, Line 10: After "are" and before "to" delete "provide" and insert -- provided --.
Column 17, Line 21: After "are" and before "to" delete "provide" and insert -- provided --.
Column 20, Line 42: After "to" and before "the" delete "determining" and insert -- determine --.
Column 21, Lines 1-2: After "be" and before "connected" delete "directed" and insert -- directly --.
Column 21, Line 41: After "out," and before "another" delete "are" and insert -- or --.
Column 22, Line 41: After "directly" and before "the" delete "connected" and insert -- connecting --.